US010366607B2

(12) United States Patent
Ahn et al.

(10) Patent No.: US 10,366,607 B2
(45) Date of Patent: Jul. 30, 2019

(54) VEHICLE AND METHOD FOR CONTROLLING THEREOF

(71) Applicant: Samsung Electronics Co., Ltd., Gyeonggi-do (KR)

(72) Inventors: Hyo In Ahn, Seoul (KR); Kyu Sung Kim, Seoul (KR); Ju Yeon You, Gyeonggi-do (KR); Jae Mo Choi, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 15/846,467

(22) Filed: Dec. 19, 2017

(65) Prior Publication Data

US 2018/0182241 A1    Jun. 28, 2018

(30) Foreign Application Priority Data

Dec. 23, 2016    (KR) .................... 10-2016-0178387

(51) Int. Cl.
*G08G 1/0967*    (2006.01)
*B60K 35/00*    (2006.01)
*B60K 37/02*    (2006.01)

(52) U.S. Cl.
CPC ........... *G08G 1/0967* (2013.01); *B60K 35/00* (2013.01); *B60K 37/02* (2013.01); *B60K 2350/1072* (2013.01); *B60K 2350/1096* (2013.01); *B60K 2350/352* (2013.01); *B60K 2350/962* (2013.01)

(58) Field of Classification Search
CPC ....... G08G 1/0967; B60K 35/00; B60K 37/02
See application file for complete search history.

(56) References Cited

U.S. PATENT DOCUMENTS

| 8,878,694 | B2 | 11/2014 | Davito |
| 9,566,896 | B2 | 2/2017 | Armenta Lopez et al. |
| 9,759,573 | B2 | 9/2017 | Meyer et al. |
| 9,840,160 | B2 | 12/2017 | Granato et al. |
| 2002/0173881 | A1* | 11/2002 | Lash ................. B60K 31/0058 701/1 |
| 2011/0098916 | A1 | 4/2011 | Jang |
| 2014/0152469 | A1 | 6/2014 | Davito |
| 2014/0324328 | A1 | 10/2014 | Granato et al. |
| 2014/0336884 | A1 | 11/2014 | Roder et al. |

(Continued)

FOREIGN PATENT DOCUMENTS

| KR | 10-2010-0040169 A | 4/2010 |
| KR | 10-2011-0045762 A | 5/2011 |

(Continued)

OTHER PUBLICATIONS

European Search Report dated Apr. 30, 2018.

*Primary Examiner* — Leon Flores
(74) *Attorney, Agent, or Firm* — Cha & Reiter, LLC.

(57) ABSTRACT

A vehicle is disclosed. The vehicle includes a display, a communication module, a memory, and one or more processors, and the one or more processors generate driving guide information of the vehicle based on traffic information, received from an external device by the communication module, and driving data of the vehicle corresponding to a preset period, which is stored in the memory, and control the generated driving guide information to be displayed on the display.

20 Claims, 13 Drawing Sheets

(56) References Cited

U.S. PATENT DOCUMENTS

2016/0046229 A1    2/2016  Armenta Lopez et al.
2016/0061611 A1*  3/2016  Meyer ................ G01C 21/3469
                                                                   701/1
2016/0117922 A1*  4/2016  Oh ..................... G08G 1/09623
                                                                   348/118

FOREIGN PATENT DOCUMENTS

KR        10-1259159 B1    4/2013
WO      2011/061384 A2    5/2011

* cited by examiner

VEHICLE AND METHOD FOR CONTROLLING THEREOF

CLAIM OF PRIORITY

This application claims the benefit under 35 U.S.C. § 119(a) of a Korean patent application filed on Dec. 23, 2016 in the Korean Intellectual Property Office and assigned Serial number 10-2016-0178387, the entire disclosure of which is hereby incorporated by reference.

TECHNICAL FIELD

The present disclosure relates to a vehicle and a method for controlling the vehicle, and more particularly, to a method for displaying driving guide information of a vehicle.

BACKGROUND

Recently, various functions for improving the convenience of a driver have been provided in a vehicle (e.g., a car). Among the various functions, there may be, for example, a function of displaying various pieces of driving guide information on a cluster screen (e.g., a dashboard) of the vehicle.

A cluster screen of the vehicle may display various information using a display. For example, the vehicle may display, on the cluster screen, driving guide information, such as the speed of the vehicle, engine revolutions per minute (RPM), gear state, as well as traffic information, a target driving speed based on the speed of the vehicle, and navigation information.

SUMMARY

In the case that the vehicle generates driving guide information based on traffic information received from an external device and driving data, such as the speed of the vehicle, most vehicles may generate similar driving guide information and thus may not provide practical help for the user (or driver).

For example, a vehicle needs to generate mutually different driving guide information in the case of approaching traffic lights while decreasing the speed of the vehicle and the case of approaching the traffic lights while increasing the speed of the vehicle, even if the vehicle moves at the same speed in front of the traffic lights.

In accordance with an aspect of the present disclosure, a vehicle may include a display, a communication module, a memory, and one or more processors and the one or more processors may generate driving guide information of the vehicle based on traffic information, received from an external device by the communication module, and driving data of the vehicle corresponding to a preset period, which is stored in the memory, and may control the generated driving guide information to be displayed on the display.

In accordance with another aspect of the present disclosure, a controlling method of a vehicle may include receiving traffic information from an external device, determining driving data, which corresponds to a preset period, of driving data of the vehicle, and generating and displaying driving guide information of the vehicle based on the traffic information and the driving data which corresponds to the preset period.

In accordance with another aspect of the present disclosure, a storage medium for storing instructions for executing a controlling method of a vehicle may store instructions that, when executed, perform operations including: determining driving data, which corresponds to a preset period, of driving data of the vehicle; and generating and displaying driving guide information of the vehicle based on traffic information, which is received from an external device, and the driving data which corresponds to the preset period.

According to various embodiments, the vehicle may receive traffic information from the external device and may generate and display the driving guide information based on driving data, which corresponds to a preset period, of driving data stored in the vehicle, thereby generating driving guide information depending on the state of each vehicle.

Accordingly, in the case of mutually different preset periods of time, the vehicle may generate and display mutually different driving guide information. In addition, in the case of mutually different driving data values, the vehicle may generate and display mutually different driving guide information.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1A:
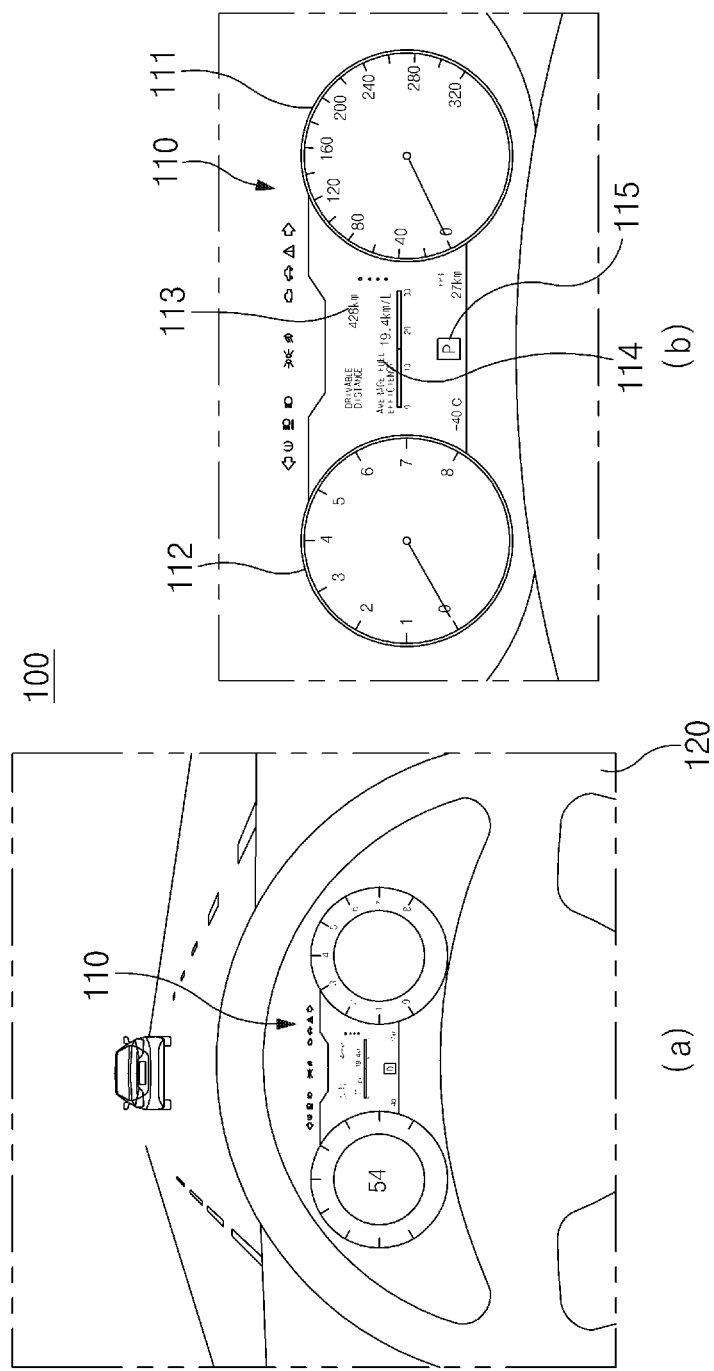
FIG. 1A, FIG. 1B, and FIG. 1C illustrate clusters included in a vehicle and situations of displaying driving guide information by utilizing the clusters, according to an embodiment of the present disclosure.

Hereinafter, various embodiments of the present disclosure may be described with reference to accompanying drawings. The order of the presentation of the embodiments is not intended to indicate a preference of any particular embodiment or any one embodiment over another. Accordingly, those of ordinary skill in the art will recognize that modification, equivalent, and/or alternative on the various embodiments described herein can be variously made without departing from the scope and spirit of the present invention. With regard to description of drawings, similar elements may be marked by similar reference numerals. The terms of a singular form may include plural forms unless otherwise specified. In this disclosure, the expressions "A or B", "at least one of A or/and B", or "one or more of A or/and B", and the like may include any and all combinations of one or more of the associated listed items. The terms, such as "first", "second", and the like may be used to refer to various elements regardless of the order and/or the priority and to distinguish the relevant elements from other elements, but do not limit the elements. When an element (e.g., a first element) is referred to as being "(operatively or communicatively) coupled with/to" or "connected to" another element (e.g., a second element), the element may be directly coupled with/to or connected to the other element or an intervening element (e.g., a third element) may be present.

According to the situation, the expression "configured to" used in this disclosure may be used as, for example, the expression "suitable for", "having the capacity to", "adapted to", "made to", "capable of", or "designed to" in hardware or software. The expression "a device configured to" may mean that the device is "capable of" operating together with another device or other components. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Figure 1B:
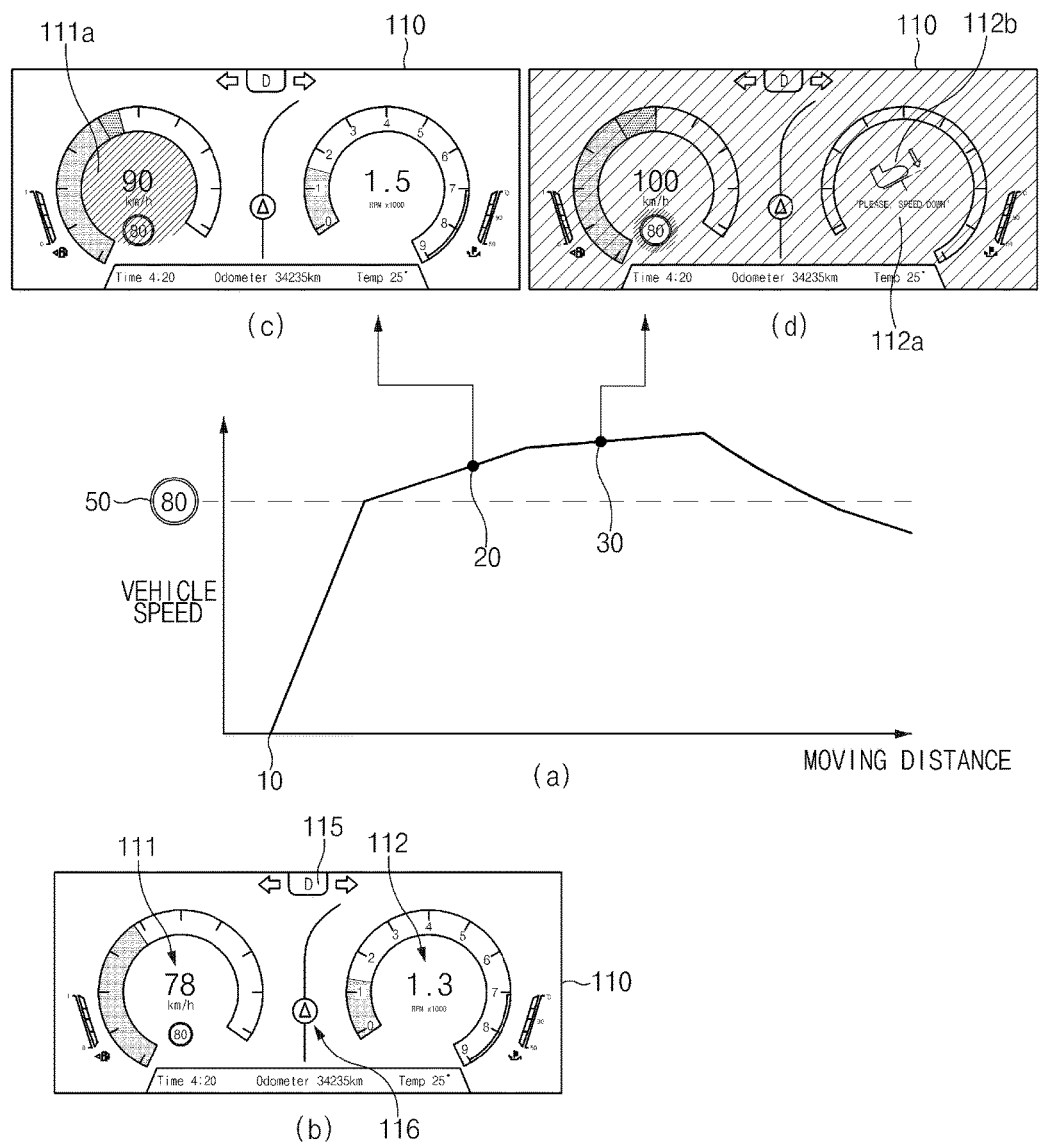
Figure 1C:
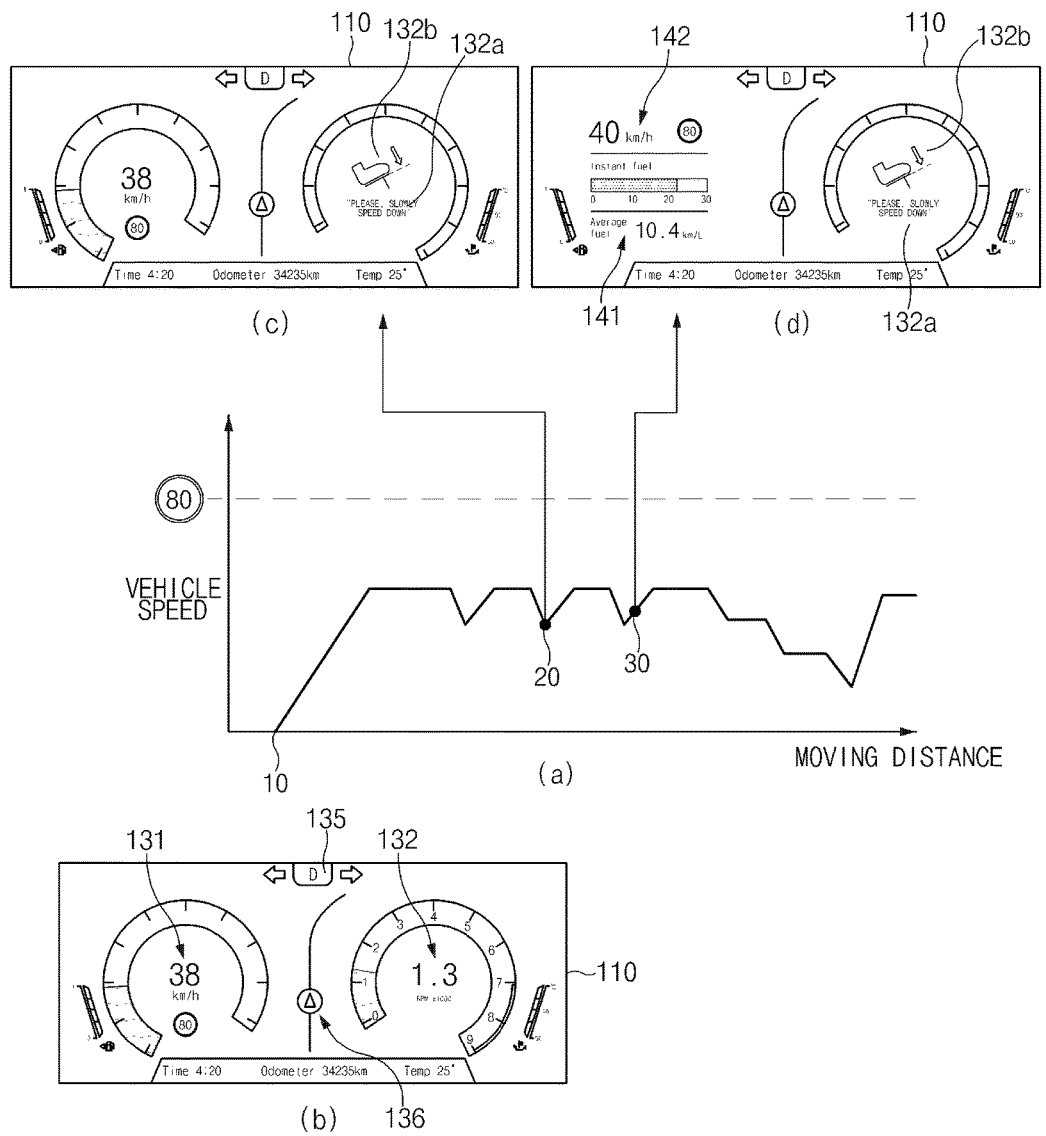

FIGS. 1A to 1C illustrate clusters included in a vehicle displaying driving guide information, according to embodiments of the present disclosure.

Referring to FIGS. 1A to 1C, a vehicle 100 may refer to, for example, a transportation, such as an automobile (including an electric vehicle or a vehicle powered by an internal combustion engine), a ship, or an airplane, which transports people or things. According to an embodiment, the vehicle 100 may include an electronic device. The electronic device may be included in the vehicle 100 to collect information associated with the vehicle 100 or to notify the information to a user and may perform various running-related controls of the vehicle 100. The electronic device may be configured in various forms and may be electrically connected with the vehicle 100 (in a wired manner or a wireless manner).

Referring to FIG. 1A, according to an embodiment, the electronic device may include, for example, at least one of a smartphone, a tablet personal computer (PC), a mobile phone, a video telephone, an electronic book reader, a desktop PC, a laptop PC, a netbook computer, a workstation, a server, a personal digital assistant (PDA), portable multimedia players (PMPs), an MP3 players, a medical device, a camera, or a wearable device.

A wearable device may include at least one of an accessory type-device (e.g., a timepiece, a ring, a bracelet, an anklet, a necklace, glasses, a contact lens, or a head-mounted device (HMD)), one-piece fabric or clothes-type device (e.g., electronic clothes), a body-attached-type device (e.g., a skin pad or a tattoo), or a bio-implantable circuit.

According to another embodiment, the electronic device may include at least one of a navigation device, a global navigation satellite system (GNSS), an event data recorder (EDR), a flight data recorder (FDR), a vehicle infotainment device, electronic equipment for a vessel (e.g., a navigation system and a gyrocompass), avionics, a security device, a head unit for a vehicle, an industrial or home robot, or a drone.

According to a certain embodiments, the electronic device may include at least one of parts of furniture, a part of a building/structure, a part of an automobile, an electronic board, an electronic signature receiving device, a projector, or various meters (e.g., a water meter, an electricity meter, a gas meter, a radio wave meters, or the like). According to an embodiment, the electronic device may be flexible or the combination of at least two of the above devices.

According to an embodiment of the present disclosure, the electronic device is not limited to the above-described devices. In the present disclosure, the term "user" used herein may refer to a person who uses the electronic device or may refer to a device (e.g., an artificial intelligence electronic device) that uses the electronic device.

FIG. 1A are views illustrating cluster screens included in the vehicle, according to an embodiment.

Referring to (A) of FIG. 1A, the vehicle 100 may include a steering device 120 and a cluster screen 110. The cluster screen 110 may, for example, corresponds to (and may be mounted to) a dashboard of the vehicle 100. (A) of FIG. 1A may illustrate a scene viewed by a user seated on a driver seat of the vehicle 100 to run the vehicle 100. The user may run the vehicle 100 by using the steering device 120 while determining various pieces of information displayed on the cluster screen 110.

(B) of FIG. 1A is an enlarged view of the cluster screen 110. Referring to (B) of FIG. 1A, the vehicle 100 may display various information by using the cluster screen 110.

The vehicle 100 may display, for example, a driving speed 111 of the vehicle 100, engine RPMs 112, a drivable distance 113, a ratio of distance to fuel consumption 114, gear position 115, or the like on the cluster screen 110. However, the information displayed on the cluster screen 110 is not limited thereto. For example, the vehicle 100 may display other information such as an indicator indicating fuel shortage, a turn indicator (left or right turn), a light indicator (on, high beam, off, automatic), of the vehicle 100. In addition, the vehicle 100 may display navigation information, driving guide information, or the like on the cluster screen 110.

According to an embodiment, the cluster screen 110 may be implemented with an electronic display (e.g., a display panel). However, the present disclosure is not limited thereto. For example, the vehicle 100 may provide the cluster screen 110, which includes at least a part of mechanical display elements such as a gauge that includes physical number markings and a pointing needle, for the driving speed 111 and the engine RPM 112. In this case, the electronic display may be disposed in reduced size in the vehicle 100 depending on the type of information to be displayed.

FIG. 1B illustrates a situation that the vehicle generates driving guide information based on driving data and traffic information and displays the driving guide information on the cluster screen, according to an embodiment.

The driving data may include, for example, battery information, a car state (e.g., driving, stop, parking, or the like), gear position and mode information (e.g., Park, Reverse, Neutral, Drive, $2^{nd}$ gear, $1^{st}$ gear, Manual, or the like), speed, engine RPMs, acceleration and deceleration operation information, turn indicator, navigation information (destination, path, or the like), mileage information, tire pressure, or driving mode information (e.g., a general mode, a fuel reduction mode, or the like). However, the driving data is not limited thereto, but may further include various pieces of data associated with the operation of the vehicle 100.

According to an embodiment, the driving data may be stored in a memory included in the vehicle 100. For example, the driving data may be generated, accumulated, and stored in the memory, in the form of a log file in real time.

The traffic information may include, for example, traffic signal information, speed limit information for a road, traffic flow information, surrounding car information, obstacle information, "Right of Way" vehicle information, accident information, or the like. The traffic information may be information associated with a road on which the vehicle 100 is located or may be information collected from a road within a specific distance from a point at which the vehicle 100 is located. However, the type of the traffic information and an amount of the traffic information are not limited thereto.

According to an embodiment, the vehicle 100 may receive the traffic information from other external electronic devices or an external server through a wired communication scheme or a wireless communication scheme.

(A) of FIG. 1B includes a graph showing the vehicle speed (vertical axis) at different moving distances (horizontal axis). (B) of FIG. 1B to (D) of FIG. 1B may illustrate information displayed on the cluster screen 110. The vehicle 100 may display driving guide information on the cluster screen 110, based on the variation in the speed of the vehicle 100 and surrounding traffic information received through a communication module.

According to an embodiment, the vehicle 100 may display information as illustrated in (B) of FIG. 1B to (D) of FIG. 1B on the cluster screen 110, based on the surrounding traffic information and the speed of the vehicle 100.

Referring to (A) of FIG. 1B, the vehicle 100 may start moving from a first point 10. Referring to (B) of FIG. 1B, the vehicle 100 may display the driving speed 111, the RPM 112, navigation information 116, the gear position 115, or the like on the cluster screen 110 until the speed exceeds a speed limit, e.g., 50 miles per hour (mph)/80 kilometers per hour (km/h). However, the present disclosure is not limited thereto, and the vehicle 100 may display other information.

According to an embodiment, the vehicle 100 may display additional information on the cluster screen 110 or change displayed driving guide information, if the moving speed of the vehicle 100 exceeds the speed limit 50 mph/80 km/h. For example, the driving data can include the speed log of the vehicle during an immediately prior time period, while the traffic information can include the speed limit of the street that the vehicle is driving on. The vehicle may detect that the vehicle is exceeding the speed limit, determine that vehicle needs to reduce the speed, and may perform some action calculated to alert the user to reduce the speed. The driving guide information can include a warning that the user is exceeding the speed limit ("speeding") and a direction to reduce the speed.

In certain embodiments, the driving information can include not just the speed, but the time exceeding a particular speed. The traffic information can include the speed limit. The driving guide information can include varying degrees of warnings and instructions to reduce speed, based on the speed of the vehicle exceeding the speed limit, and the amount of time that the vehicle exceeds the speed limit.

The speed limit can be received from an external device. For example, the vehicle may receive satellite positioning signals to determine the vehicle's latitude/longitude position. The vehicle can then use the latitude/longitude position to determine a street position (nearest intersection, distance marker), either using a local database or by transmitting the latitude/longitude position to an external server to access an electronic street map. The electronic street map can also include the speed limit at the street position.

The external server can be an electronic device that is inside, but not necessarily attached to the vehicle, such as a personal computer, smartphone, or tablet communicatively coupled using, for example, but not limited to, a Bluetooth connection or wired connection. Alternatively, the external device can forward the information to a remote electronic device using, for example, a cellular data connection.

In another embodiment, the street infrastructure can be configured to wirelessly transmit the speed limit to the vehicle via a communication module.

For example, if the speed of the vehicle 100 exceeds the speed limit, e.g., 50 mph/80 km/h (a second point 20), the vehicle 100 may display the speed limit 50 mph in an expanded size on the cluster screen 110. In addition, the vehicle 100 may inform a user about that the speed of the vehicle 100 exceeds the speed limit, e.g. 50 mph/80 km/h, by displaying, in different color, a part 111a of an area of the cluster screen 110, which displays the moving speed.

According to an embodiment, the vehicle 100 may display driving guide information on the cluster screen 110 or change the displayed driving guide information, based on accumulated driving data, if a preset period elapses in the state that the speed of the vehicle 100 exceeds the speed limit, 50 mph/80 km/h. In this case, the vehicle 100 may display driving guide information different from the driving guide information which has been displayed on the cluster screen 110 at the second point 20.

For example, if the moving speed the vehicle 100 is maintained at the speed limit or more or continuously increased for the preset period (a third point 30), in the state that the moving speed of the vehicle 100 exceeds the speed limit 50, for example, 80 km, the vehicle 100 may inform the user about that the present moving speed of the vehicle 100 exceeds the speed limit (50 mph/80 km/h) by displaying, in different color, the entire part of the cluster screen 110. In addition, the vehicle 100 may display, on the cluster screen 110, a guide message 112a of guiding the decreasing of the moving speed of the vehicle 100 and an icon 112b.

As described above, according to an embodiment, the vehicle 100 may receive traffic information associated with an area, in which the vehicle 100 is located, and may generate driving guide information based on driving data of the vehicle 100, which corresponds to a specific period. The vehicle 100 may display the generated driving guide information on the cluster screen 110 such that the user recognizes the driving guide information while running the vehicle 100.

However, the vehicle 100 of the present disclosure is not limited to displaying the driving guide information on the cluster screen 110. For example, in the case that the vehicle 100 includes an additional display, the vehicle 100 may display the driving guide information on the additional display.

According to another embodiment, the vehicle 100 may display the driving guide information by using another external electronic device including the display. For example, the vehicle 100 may transmit the generated driving guide information to another electronic device, such as a smartphone or a tablet PC, through a communication module. In this case, the another electronic device, such as a smartphone or a tablet PC, may be detachable from the vehicle 100.

FIG. 1C illustrates another situation that the vehicle generates driving guide information based on driving data and traffic information and displays the driving guide information on the cluster screen, according to an embodiment.

(A) of FIG. 1C is a graph illustrating the variation in a speed as a function of a moving distance. In addition, (B) of FIG. 1C to (D) of FIG. 1C may illustrate information displayed on the cluster screen 110. The vehicle 100 may display driving guide information on the cluster screen 110 based on the variation in the speed of the vehicle 100 and surrounding traffic information received through a communication module.

According to an embodiment, the vehicle 100 may display information as illustrated in (B) of FIG. 1C to (D) of FIG. 1C on the cluster screen 110, based on the surrounding traffic information and the speed of the vehicle 100.

Referring to (A) of FIG. 1C, the vehicle 100 may start moving from the first point 10. Referring to (B) of FIG. 1C, the vehicle 100 may display a driving speed 131, an engine RPM 132, navigation information 136, a gear position 135, or the like on the cluster screen 110. However, the present disclosure is not limited thereto, and the vehicle 100 may display various other information.

According to an embodiment, the vehicle 100 may display additional information on the cluster screen 110 or change displayed driving guide information, if the moving speed of the vehicle 100 repeatedly shows a specific pattern.

For example, in the case that the moving speed of the vehicle 100 shows a pattern of alternately decreasing and increasing at a time interval shorter than a preset time interval (the second point 20), repeatedly one time or two times, the vehicle 100 may display an icon 132b on the cluster screen 110 together with a message 132a of "Please, slowly speed down".

According to an embodiment, the vehicle may detect that the user is engaged in a specific driving pattern, determine that the user needs to slowly reduce their speed, and may perform some action calculated to cause the user to reduce the speed. The vehicle 100 may display driving guide information on the cluster screen 110 or change the displayed driving guide information, based on accumulated driving data in the case that the moving speed of the vehicle 100 shows a specific pattern repeatedly by more than the preset number of times or for a preset period or more. In this case, the vehicle 100 may display driving guide information different from driving guide information which has been displayed at the second point 20 or may add new driving guide information.

For example, in the case that the moving speed of the vehicle 100 shows a pattern of alternately decreasing and increasing at a time interval shorter than a preset time interval, repeatedly by more than the preset number of times or for a preset period or more, fuel efficiency of the vehicle 100 may be reduced. Accordingly, the vehicle 100 may display information on average fuel efficiency 141 and present fuel efficiency 142 on the cluster screen 110.

Simultaneously or sequentially, the vehicle 100 may change a driving mode to an eco-driving mode to improve the fuel efficiency. The eco-driving mode may be, for example, a mode of setting the RPM of an engine to a specific RPM or less to improve the fuel efficiency. In addition, the vehicle 100 may display, on the cluster screen 110, the icon 132b together with the message 132a of "Please, slowly speed down".

As described above, according to an embodiment, the vehicle 100 may receive traffic information associated with an area, in which the vehicle 100 is located, and may generate driving guide information or a driving mode, based on driving data of the vehicle 100, which corresponds to a specific period. The vehicle 100 may display the generated driving guide information on the cluster screen 110 such that the user recognizes the driving guide information while running the vehicle 100, and may change a driving mode of the vehicle 100.

Figure 2A:
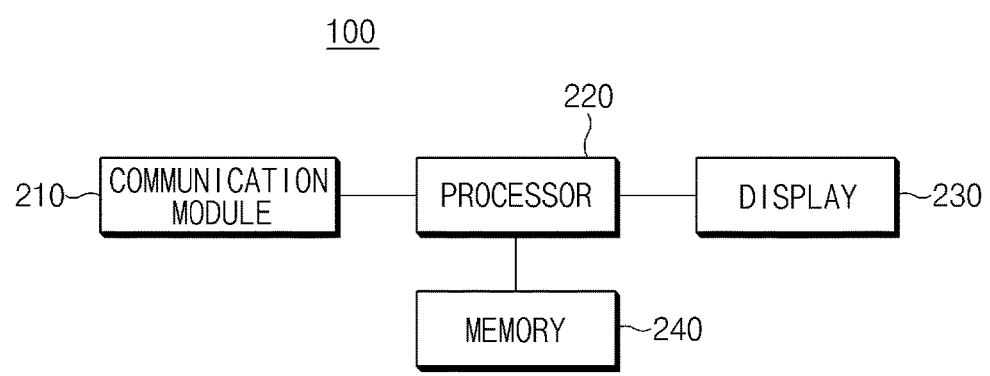
FIG. 2A and FIG. 2B are block diagrams schematically illustrating the vehicle, according to an embodiment of the present disclosure.
Figure 2B:
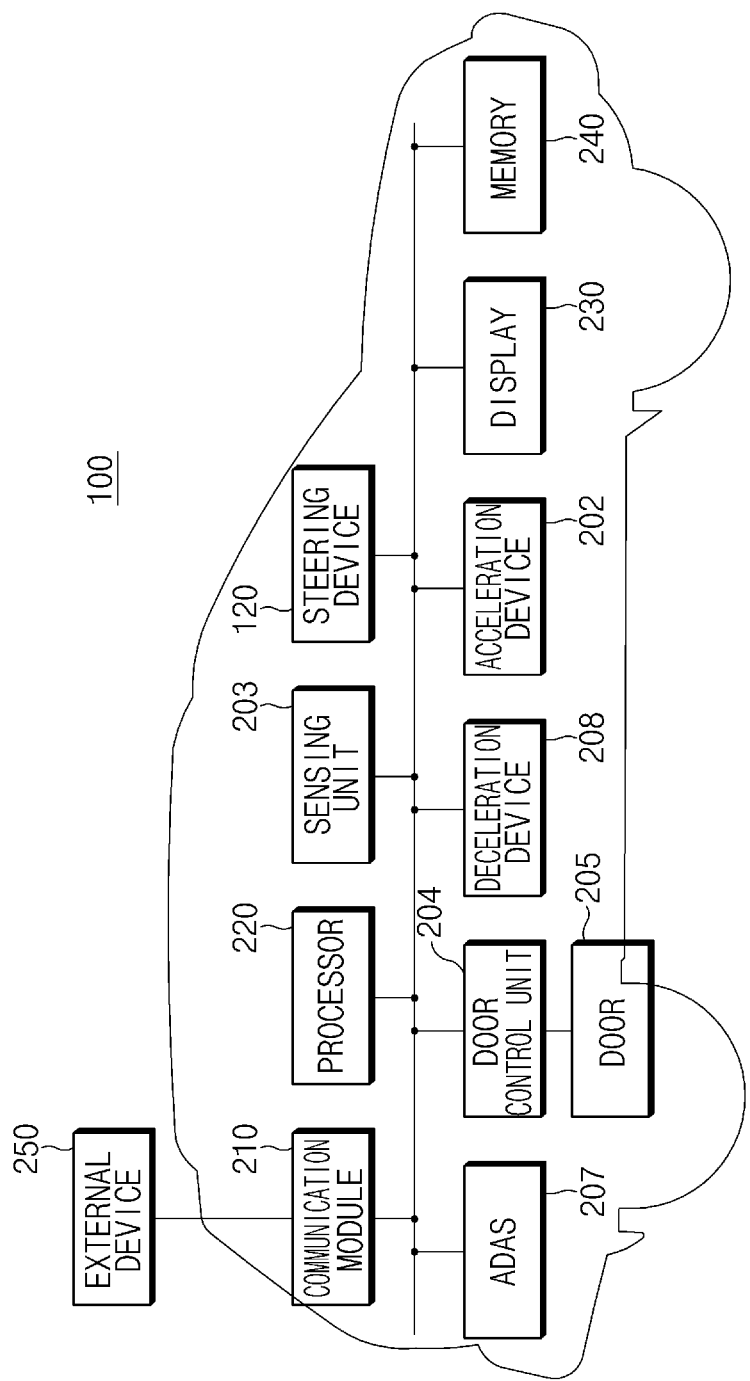

FIGS. 2A and 2B are block diagrams schematically illustrating the vehicle, according to an embodiment.

Referring to FIG. 2A, the vehicle 100 may include a communication module 210, a processor 220, a display 230, and a memory 240. However, the present disclosure is not limited thereto.

The communication module 210 may include, for example, a cellular module, a WiFi module, a Bluetooth module, an RF module, Satellite Positioning Signal (SPS) receiver, or the like, including combinations thereof. The communication module 210 may form a network together with external another electronic device under the control of the processor 220.

According to an embodiment, the communication module 210 may receive, under the control of the processor 220, traffic information associated with an area, in which the vehicle 100 is located, from an external server managing the traffic information. However, traffic information received by the communication module 210 is not limited thereto, but the communication module 210 may receive traffic information associated with various areas under the control of the processor 220 if necessary.

According to another embodiment, the communication module 210 may receive driving guide information of other vehicles existing in the area, in which the vehicle 100 is located, under the control of the processor 220. For example, the communication module 210 may receive driving guide information of vehicles which are running on the same road as the road on which the vehicle 100 is running.

The processor 220 may run, for example, an operating system (OS) or an application to control a plurality of hardware or software elements connected with the processor 220 and may perform various data processing and arithmetic operations.

According to an embodiment, the processor 220 may generate driving guide information based on traffic information collected through the communication module 210, and driving data, which corresponds to a preset period, of driving data of the vehicle 100, which is stored in the memory 240. The processor 220 may control the generated driving guide information to be displayed on the display 230.

The display 230 may include, for example, a liquid crystal display (LCD), a light-emitting diode (LED) display, an organic LED (OLED) display, a microelectromechanical systems (MEMS) display, or an electronic paper display. The display 230 may include a touch screen and may receive, for example, a touch, gesture, proximity, or hovering input using an electronic pen or a part of a user's body. According to an embodiment, the display 230 may correspond to the cluster screen 110 of FIG. 1.

According to an embodiment, the display 230 may display the driving guide information of the vehicle 100, which is generated by the processor 220, under the control of the processor 220.

The memory 240 may store driving data generated while the vehicle 100 is moving. In addition, the memory 240 may store traffic information received by the vehicle 100 from external another electronic device, another vehicle, or the server.

Referring to FIG. 2B, the vehicle 100 may include advanced driver assistance systems (ADAS) 207, which is an example of a control device, the processor 220, which performs the overall control of operations, such as driving/braking/steering of the vehicle 100, which are associated with the running of the vehicle 100, a door control unit 204 which controls a door 205 of the vehicle 100, the door 205, the steering device 120 (e.g., a steering wheel, although other embodiments can use other devices), an acceleration device 202 (e.g., the accelerator, or "gas" pedal), a deceleration device (e.g., a brake pedal) 208, the communication module 210, the display 230, the memory 240, and a sensing unit 203.

In detail, the processor 220 may sense, for example, the state of the vehicle 100 to determine a fuel injection amount and ignition timing, thereby preventing an engine of the vehicle 100 from malfunctioning. The processor 220 may be referred to as an electronic control unit (ECU). For example, the processor 220 may correct a water temperature sensor and an oxygen sensor based on an ignition timing manifold absolute pressure (MAP) value and a fuel injection MAP value preset by taking into consideration the RPM, an intake air mass, and an intake pressure of an engine, and the opening degree of an accelerator of the vehicle 100 and may adjust the opening ratio of an injector.

In addition, the communication module 210 may perform communication with an external device 250 (e.g., a cloud server) located in the outside of the vehicle 100 by using a telecommunication module or a short range radio communication module. In the case of using the telecommunication module, the communication module 210 may perform communication with the external device 250 according to a communication standard, such as an IEEE communication standard, a 3rd Generation (3G) communication standard, a 3rd Generation Partnership Project (3GPP) communication standard, Long Term Evolution (LTE), Global Positioning System (GPS), or the like. In the case of using a short range radio communication module, the communication module 210 may perform communication with the external device 250 according to a communication standard, such as Wi-Fi, Bluetooth, NFC, ZigBee, Picocast, or the like.

In addition, the communication module 210 may use, for example, a 20-pin connector, a 16-pin connector, or a USB connector in the case of performing. The communication module 210 may perform communication according to a communication protocol, such as On-Board Diagnosis Version I (OBD-1), OBD-2, European On-Board Diagnosis (EOBD), Korean On-Board Diagnosis (KOBD), K-Line, RS-232, Controller Area Network (CAN), or the like.

The sensing unit 203 may sense a surrounding environment of the vehicle 100 or the state of a driver who has boarded the vehicle 100. The sensing unit 203 may include, for example, an object sensor, such as a Lidar sensor, a Radar sensor, an ultrasonic sensor, a vision sensor, or the like, to sense the surrounding environment of the vehicle 100. In this case, the surrounding environment of the vehicle 100 may refer to information on another vehicle located around the vehicle 100, an occupied object or a human located around the vehicle 100, or the like.

The sensing unit 203 may include, for example, a sound sensor, a motion sensor, a video sensor, a touch sensor, or the like to sense the state of the driver. In this case, the state of the driver may refer to the fatigue of the driver, the driving posture of the driver, or the like. Especially, the fatigue of the driver may be determined by tracking the eyes of the driver or the facial motion of the driver.

Besides, the sensing unit 203 may further include at least one of an acceleration sensor, a gyro sensor, an illuminance sensor, a proximity sensor, a pressure sensor, a noise sensor (e.g., a microphone), a video sensor (e.g., a camera module), a temperature sensor, a shock sensor, or a timer.

According to an embodiment, one of the accelerator, brakes, steering wheel can be used to provide the processor with driving data, such as speed and turning direction. The communication module 210 can provide the processor 220 with traffic information from an external device 250. The processor 220 can determine and generate driving guide information based on the driving data and the traffic information.

According to an embodiment, a vehicle may include a display, a communication module, a memory, and one or more processors, and the one or more processors may generate driving guide information of the vehicle based on traffic information, which is received from an external device by using the communication module, and driving data, which corresponds to a preset period, of driving data of the vehicle, which is stored in the memory, and may control the generated driving guide information to be displayed on the display.

According to an embodiment, in the vehicle, the preset period may include a first period and a second period different from the first period, and the processor may generate first driving guide information based on driving data corresponding to the first period, and generate second driving guide information different from the first driving guide information based on driving data corresponding to the second period.

According to an embodiment, in the vehicle, the processor may generate first driving guide information or second driving guide information, which is different from the first driving guide information, based on a variation in a value included in at least one of items included in the driving data corresponding to the preset period.

According to an embodiment, in the vehicle, if the driving data is speed information of the vehicle, the processor may generate and display the first driving guide information, if the speed information of the vehicle exceeds a speed limit for the first period, and may generate and display the second driving guide information, if the speed information of the vehicle exceeds the speed limit for the second period.

According to an embodiment, the vehicle can determine the speed limit by determining the position of the vehicle using a satellite positioning system; determining a street position using the position by accessing an electronic map; and determining the speed limit at the street position.

According to an embodiment, in the vehicle, if the driving data is speed variation information of the vehicle, the processor may generate and display the first driving guide information based on first speed variation information corresponding to the first period, and may generate and display the second driving guide information based on second speed variation information corresponding to the second period.

According to an embodiment, in the vehicle, if at least one of items included in the driving data corresponding to the preset period is posture information of the vehicle, the processor may generate and display the first driving guide information if the vehicle is inclined in a first direction, and may generate and display the second driving guide information if the vehicle is inclined in a second direction different from the first direction.

According to an embodiment, in the vehicle, the processor may update the driving data of the vehicle, which is stored in the memory, at a specific cycle if the vehicle moves.

According to an embodiment, in the vehicle, the processor may control at least one of a character, an icon, a color included in the second driving guide information to be displayed differently from the first driving guide information.

According to an embodiment, in the vehicle, the traffic information may include at least one of traffic signal information, speed limit information for a road, traffic flow information, surrounding car information, obstacle information, urgent car information, or accident information.

According to an embodiment, in the vehicle, the driving data of the vehicle may include at least one of car power information, car state information, gear state and shift information, speed information, a revolution per minute of an engine, acceleration and deceleration operation information, turn indicator information, navigation information, mileage information, tire pressure information, or driving mode information.

Figure 3:
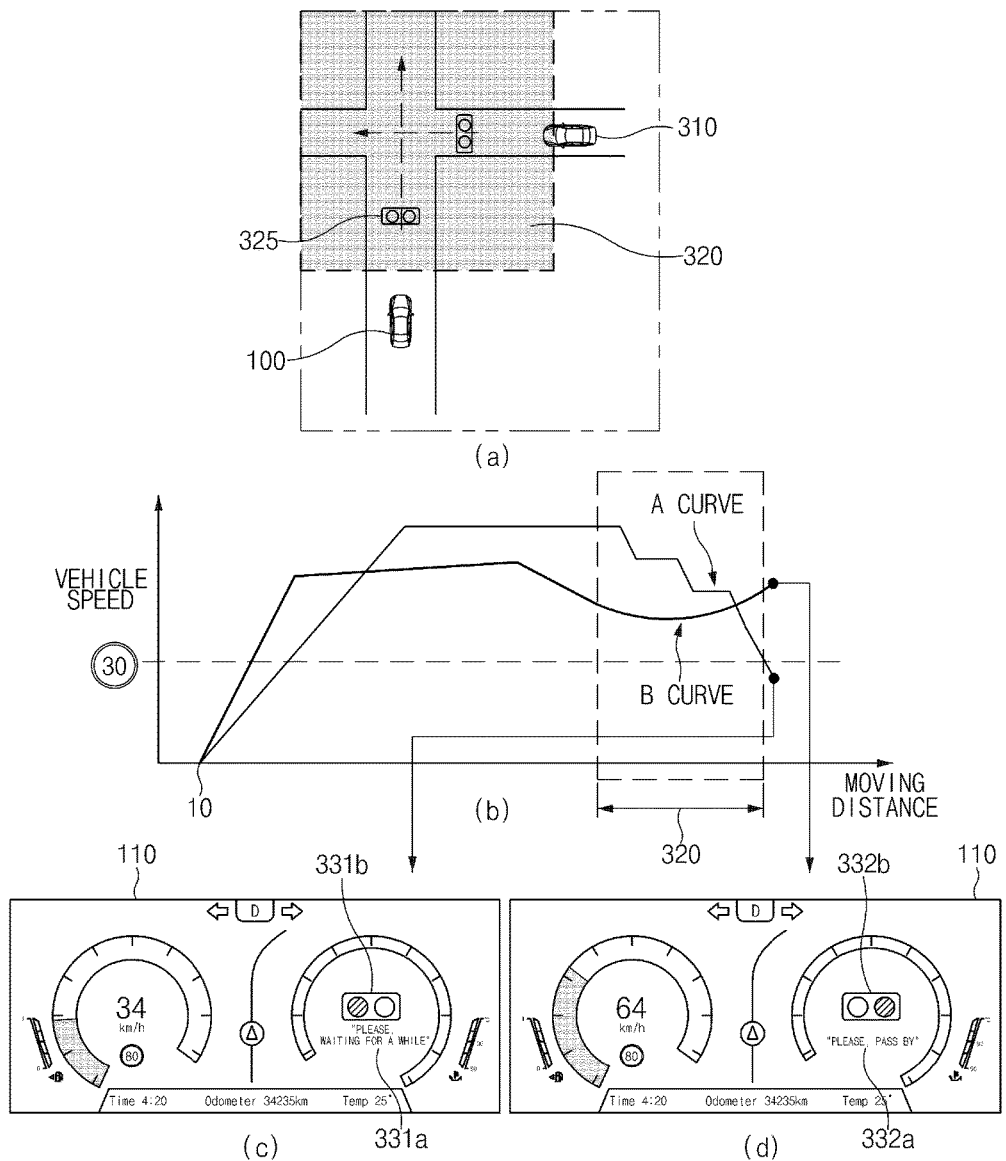
FIG. 3 illustrates the situation that a vehicle generates driving guide information based on traffic information and driving data of the vehicle and displays the driving guide information, in the case of entering an intersection, according to an embodiment of the present disclosure.

FIG. 3 illustrates the situation of generating driving guide information based on traffic information and driving data of the vehicle and of displaying the driving guide information, in the case that the vehicle enters an intersection, according to an embodiment.

Accordingly to certain embodiments, the driving information can be the speed of the vehicle as a function of the location. The traffic information can be the state of a traffic light. The vehicle 100 can detect the condition where the vehicle is moving while the traffic light is red, determine that the vehicle needs to stop, and perform some action calculated to cause the user to stop the vehicle. Alternatively, the traffic signal can be green and the vehicle 100 can detect that the car is slowing down while the traffic signal is green, determine that the vehicle should proceed through the intersection, and perform some action calculated to cause the user to proceed through the intersection.

Referring to FIG. 3(a), the vehicle 100 and another vehicle 310 may enter the intersection. The vehicle 100 and the another vehicle 310 may generate respective driving guide information based on relevant driving data and received traffic information.

FIG. 3(b) is a graph illustrating the variation in a speed as a function of a moving distance of the vehicle 100. FIG. 3(c) and FIG. 3(d) may illustrate information displayed on the cluster screen 110.

According to an embodiment, the vehicle 100 may display information as illustrated in (B) of FIG. 1B to (D) of FIG. 1B on the cluster screen 110, based on the surrounding traffic information and the driving data of the vehicle 100.

In certain embodiments, the surrounding traffic information can be the location and state of a traffic light. The traffic information can be determined, for example, using GPS signaling determine the location of the vehicle, and access to an electronic street map to determine whether the vehicle is proximate to a traffic light. The state of the traffic light can be determined by accessing timing information for the traffic light which may be included in the electronic street map.

In another embodiment, the vehicle 100's communication module and the traffic light can communicate using a predetermined protocol, such as but not limited to short range communication, where the traffic light communicates its state to the vehicle.

In another embodiment, the vehicle 100 uses a camera to detect the state of the traffic light.

Referring to FIG. 3(b), the vehicle 100 may start moving from first point 10. According to an embodiment, the vehicle 100 may display additional information on the cluster screen 110 based on driving data corresponding to a specific period or change displayed driving guide information, if the vehicle 100 enters a preset area (e.g., an A area 320) from the intersection.

For example, the vehicle 100 may run while sequentially decreasing the moving speed, after entering the preset area (e.g., the A area 320) from the intersection as expressed in an A curve on the graph illustrated in FIG. 3(b). In addition, traffic lights 325 located in a moving direction of the vehicle 100 may be in a red signal state. In this case, as illustrated in FIG. 3(c), the vehicle 100 may display, on the cluster screen 110, an icon 331b, which represents red light, together with a message 331a of "Please Wait".

For example, the vehicle 100 may run while increasing the moving speed, after entering the preset area (e.g., the A area 320) from the intersection as expressed in a B curve on the graph illustrated in FIG. 3(b). In addition, traffic lights 325 located in a moving direction of the vehicle 100 may be in a green signal state. In this case, as illustrated in FIG. 3(d), the vehicle 100 may display, on the cluster screen 110, an icon 332b, which represents green light, together with a message 332a of "Please, Proceed through the Intersection".

According to another embodiment, the traffic lights 325 located in the moving direction of the vehicle 100 may be in a green signal state, when the moving speed of the vehicle 100 is decreased after the vehicle 100 enters the preset area from the intersection. In addition, when the moving speed of the vehicle 100 is increased, the traffic lights 325 located in the moving direction of the vehicle 100 may be the red signal state. In this case, the vehicle 100 may display various pieces of driving guide information on the cluster screen 110 to reduce traffic congestion and to prevent an accident, on the intersection based on remaining time until the traffic lights are changed and based on the distance between the central area of the intersection and the vehicle 100.

Figure 4:
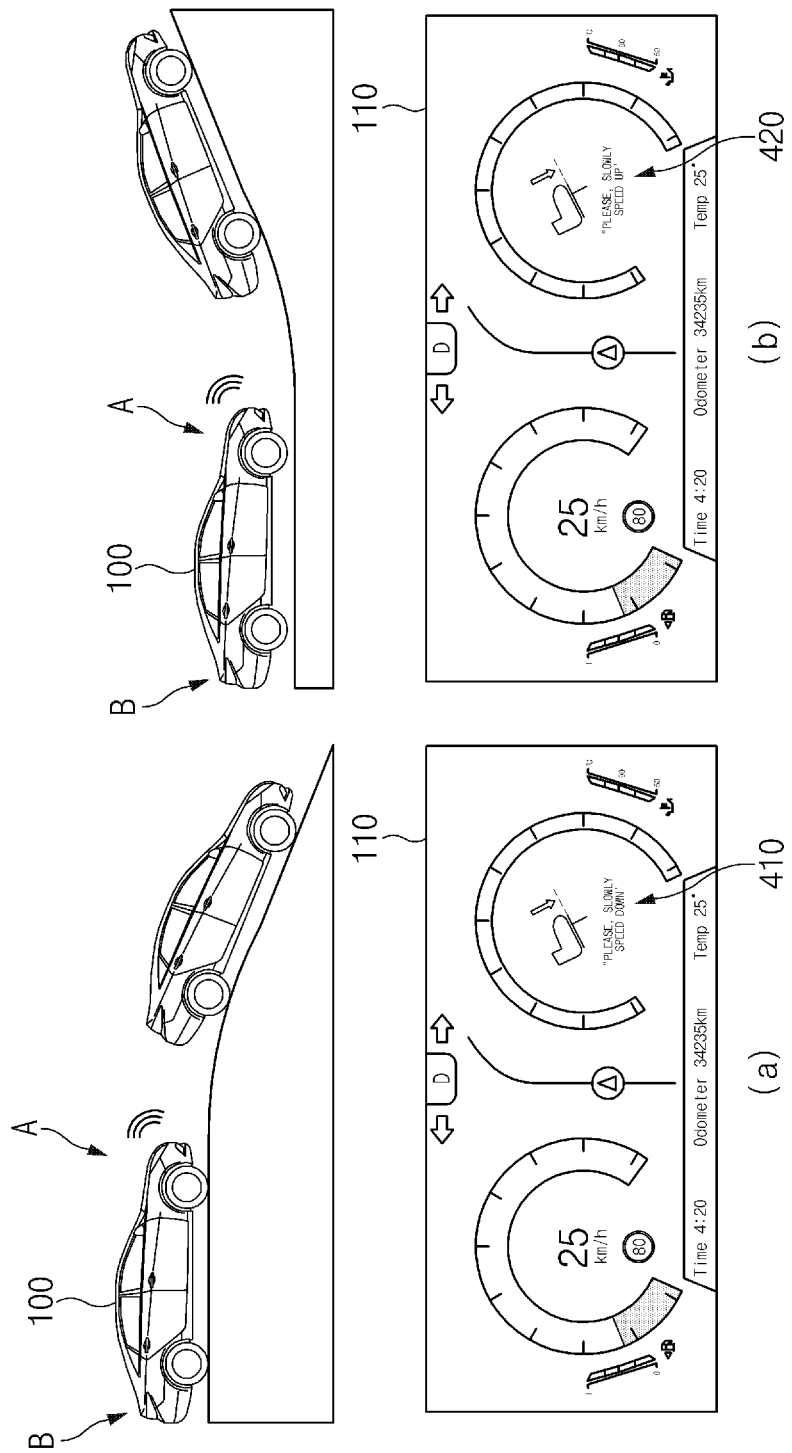
FIG. 4 illustrates a situation that the vehicle generates driving guide information based on information related to a surrounding terrain and displays the driving guide information, according to an embodiment of the present disclosure.

FIG. 4 illustrates a situation that the vehicle generates driving guide information based on information related to a surrounding terrain and displays the driving guide information, according to an embodiment.

Referring to FIG. 4, the vehicle 100 may sense the information on a terrain located in the moving direction of the vehicle 100. For example, the vehicle 100 may sense the information on the terrain by using a camera (not illustrated) located in the moving direction of the vehicle 100. In certain embodiments, the vehicle 100 can detect that the vehicle is driving downhill and the present speed of the vehicle is excessive, due to the downward force of the hill, determine that the vehicle needs to decrease its speed, and perform some action calculated to cause the user to reduce the speed. Alternatively, the vehicle 100 can detect that the vehicle is driving uphill and the present speed of the vehicle is insufficient, due to the downward force of the hill, determine that the vehicle needs to increase its speed, and perform some action calculated to cause the user to increase the speed According to another embodiment, the vehicle 100 may sense terrain information of a road, on which the vehicle 100 is moving, by using the terrain information of traffic information received through the communication module (e.g., the communication module 210 of FIG. 2).

According to another embodiment, the vehicle 100 may sense the terrain information by using a sensor, such as a gyro sensor or an acceleration sensor, which is able to determine the posture information of the vehicle 100. According to an embodiment, the vehicle 100 may display mutually different driving guide information in the case that the vehicle 100 is inclined in a first direction and the case that the vehicle 100 is inclined in a second direction different from the first direction, based on a sensing value received from the above sensor. The first direction may represent, for example, the case that a front surface A of the vehicle 100 (e.g., the direction that a driver faces) is lowered, and the second direction may be represent, for example, the case that a rear surface B of the vehicle 100 (e.g., a direction opposite to the direction that the driver faces) is lowered.

For example, referring to FIG. 4(*a*), in the case that the vehicle 100 enters a downhill section of the road and runs by a preset distance or more or runs for a preset time or more, the vehicle 100 may display a message 410 of "slowly speed down" on the cluster screen 110. Referring to FIG. 4(*b*), in the case the vehicle 100 enters an uphill section of the road, the vehicle 100 may display a message 420 of "slowly speed up" on the cluster screen 110.

According to an embodiment, the vehicle 100 may display the above-described driving guide information based on the terrain information included in the received traffic information or by analyzing an image input through the camera included in the vehicle 100.

As described above, the vehicle 100 may display, on the cluster screen 110, the driving guide information generated based on the terrain information.

Figure 5:
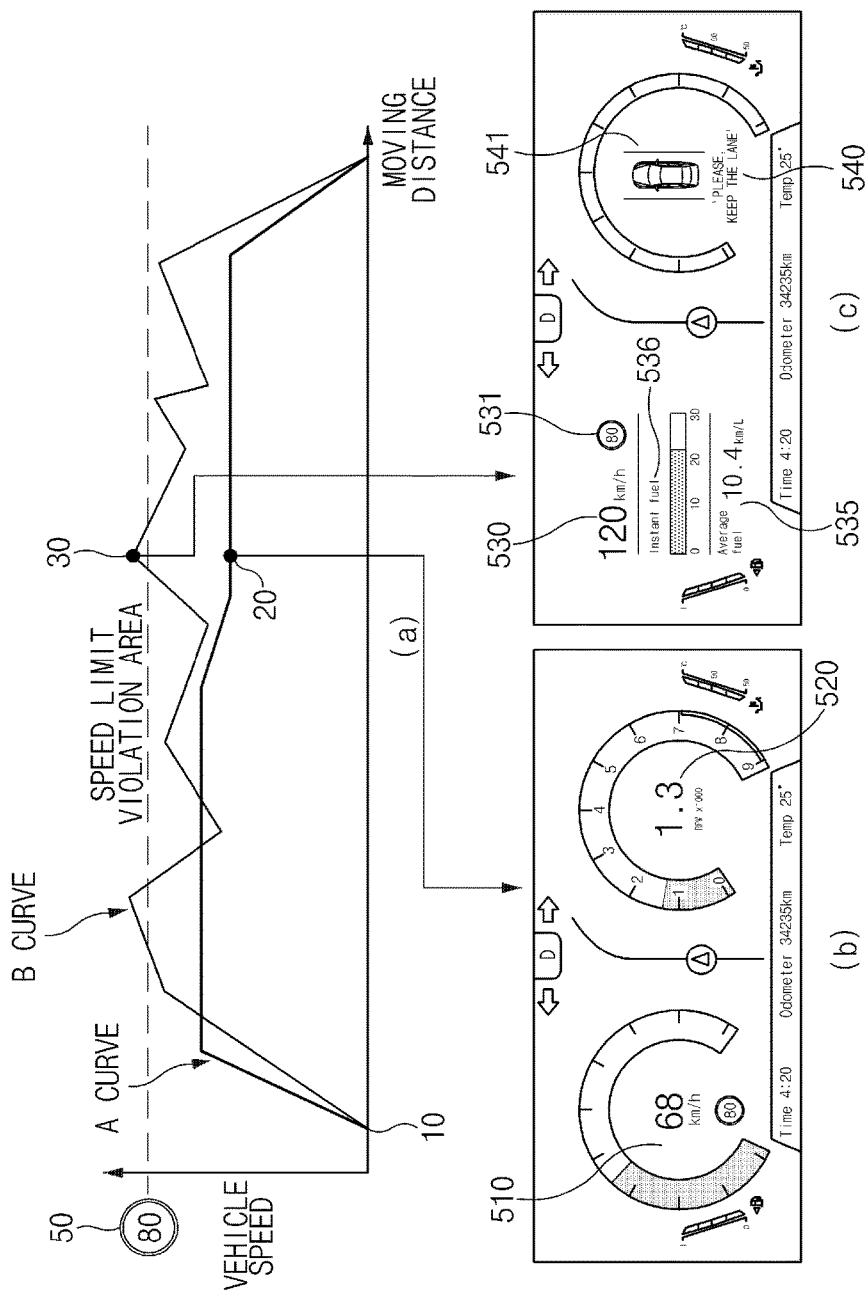
FIG. 5 illustrates a situation that the vehicle generates different driving guide information based on accumulated driving data and displays the driving guide information, according to an embodiment of the present disclosure.

FIG. 5 illustrates a situation that the vehicle generates different driving guide information based on accumulated driving data and displays the driving guide information, according to an embodiment.

FIG. 5(*a*) is a graph illustrating the variation in a speed as a function of a moving distance of the vehicle 100. FIG. 5(*b*) and FIG. 5(*c*) may illustrate information displayed on the cluster screen 110. According to an embodiment, the vehicle 100 may display information as illustrated in (B) of FIG. 1B to (D) of FIG. 1B on the cluster screen 110, based on the surrounding traffic information and the speed of the vehicle 100.

Referring to FIG. 5(*a*), the vehicle 100 may start moving from the first point 10. For example, the vehicle 100 may move to a destination within the speed limit 50 as illustrated in an A curve on the graph of FIG. 5(*a*). In this case, as illustrated in FIG. 5(*b*), the vehicle 100 may display a driving speed 510 and an RPM 520 on the cluster screen 110 at the second point 20.

According to an embodiment, in the case that the vehicle 100 repeatedly moves the same moving path while maintaining a driving pattern the same as or similar to a pattern of the A curve on the graph of FIG. 5(*b*), the vehicle 100 may store a driving pattern of the vehicle 100 on the path in a memory (e.g., the memory 240 of FIG. 2A).

In the case that the vehicle 100 drives in a pattern different from a moving pattern, which is previously stored, while being moving the same path as the path stored in the memory (e.g., the memory 240 of FIG. 2A), the vehicle 100 may generate the driving guide information based on a previous driving pattern.

For example, the vehicle 100 may run in a driving pattern different from the previously stored driving pattern in terms of the width of a speed variation and the number of times of changing a lane as illustrated in a B curve on the graph of FIG. 5(*a*). In this case, as illustrated in FIG. 5(*b*), the vehicle 100 may display a present driving speed 530 and an RPM 531 on the cluster screen 110 at a third point 30. In addition, the vehicle 100 may display information on average fuel efficiency 535 and present fuel efficiency 536 on the cluster screen 110 to induce a user to drive in a previous driving pattern. In addition, the vehicle 100 may display, on the cluster screen 110, a message 540 of "Please, Stay in Your Lane" or an icon 541 to induce the user to safely drive.

According to various embodiments, the vehicle 100 may update a driving pattern accumulated based on a moving distance and may generate driving guide information based on the updated driving pattern.

For example, the vehicle 100 may repeatedly run such that a driving pattern is different from the previously stored driving pattern in terms of the width of a speed variation and the number of times of changing a lane on the same road, as illustrated in the B curve on the graph illustrated in FIG. 5(*a*). If the vehicle 100 runs as illustrated in the B curve by the preset number of time or more, the vehicle 100 may update the previously stored driving pattern for the road.

Accordingly, the vehicle 100 may generate the driving guide information as illustrated in FIG. 5(*b*) and display the driving guide information on the cluster screen 110, instead of generating the driving guide information as illustrated in FIG. 5(*c*), even if the vehicle 100 runs similarly to the B curve after the driving pattern is changed.

As described above, according to an embodiment, the vehicle 100 may generate driving guide information necessary for the user based on driving data corresponding to a preset period and may display the driving guide information on the cluster screen 110.

Figure 6:
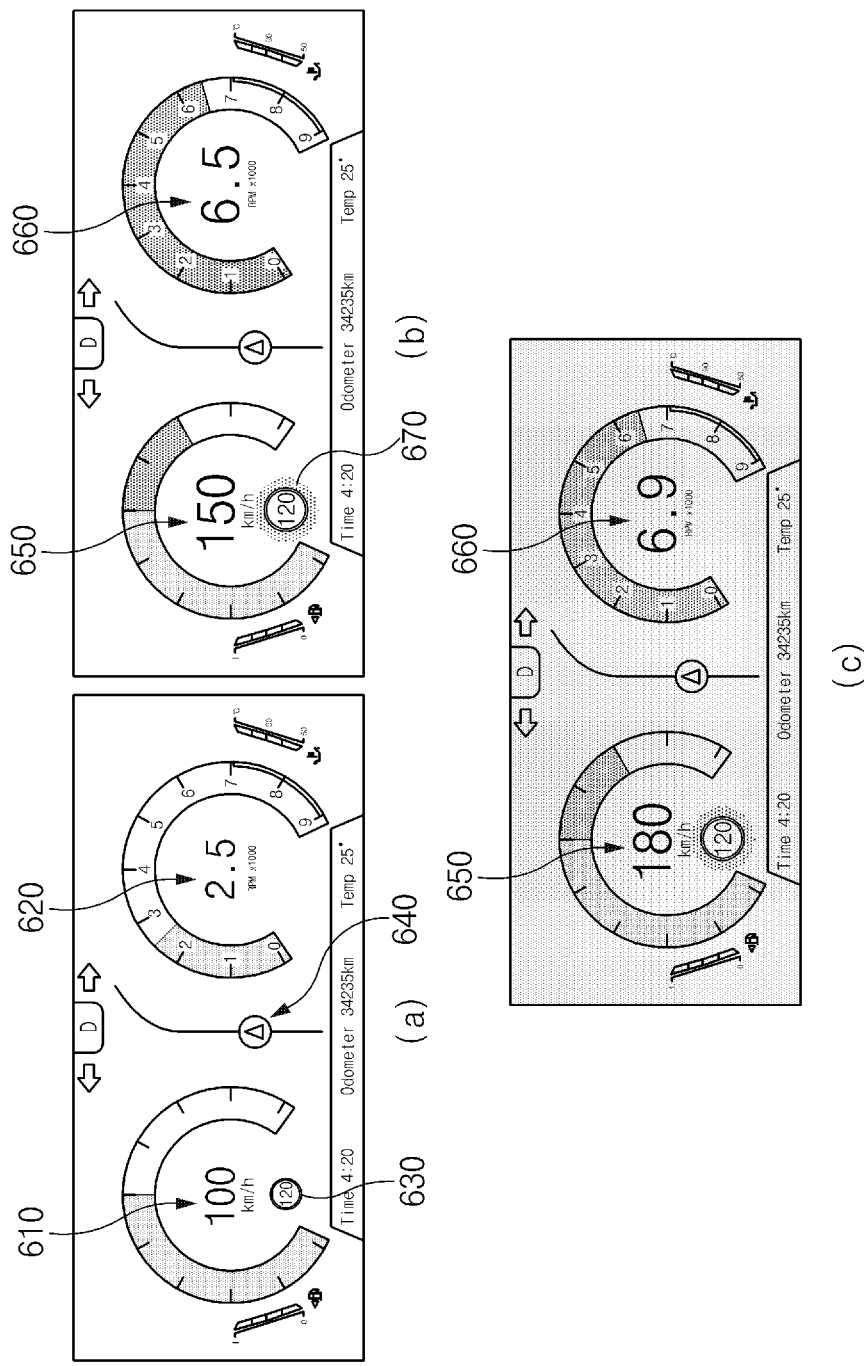
FIG. 6 illustrates that the vehicle configures mutually different cluster screens to display first driving guide information and second driving guide information, according to an embodiment of the present disclosure.

FIG. 6 illustrates that the vehicle configures mutually different cluster screens to display first driving guide information and second driving guide information, according to an embodiment.

Referring to FIG. 6(*a*), the vehicle 100 may generate driving guide information based on driving data and traffic information and may display the driving guide information on the cluster screen 110. For example, the vehicle 100 may generate and display, as first driving guide information, a driving speed 610 of the vehicle 100, an RPM 620 of an engine, a speed limit 630 for a present driving road, navigation information 640, or the like, which are included in driving data, which corresponds to a first period, of accumulated driving data.

According to an embodiment, the vehicle 100 may change the configuration of driving guide information based on driving data corresponding to a second period, which is different from the driving data corresponding to the first period. For example, the second period may be set to a period longer than the first period.

Referring to FIG. 6(*b*), in the case that the vehicle 100 runs while violating a speed limit for the first period, the vehicle 100 may display characters, which represent the moving speed 650 of the vehicle 100, the RPM 660 of the engine, and the speed limit 670 for the present road, in enlarged size.

Referring to FIG. 6(*c*), in the case that the vehicle 100 runs while violating a speed limit for the second period, the vehicle 100 may display the cluster screen 110 by changing the color of the entire part of the cluster screen 110 or while changing the color of the entire part of the cluster screen 110 to various colors. For example, the vehicle 100 may display the cluster screen 110 in red color, or may sequentially express a red color, an orange color, and a blue color on the cluster screen 110. Accordingly, the vehicle 100 may induce a user to decrease the moving speed of the vehicle 100.

According to another embodiment, the vehicle 100 may change the configuration of the driving guide information based on a variation in a value representing at least one of items included in the driving data. For example, the vehicle 100 may change the color of the entire part of the cluster screen 110 or may display the driving guide information by changing the character representing the driving guide information to a bold character, as illustrated in FIG. 6(*c*), in the case that the variation in the speed exceeds a preset value for a preset period.

As described above, the vehicle 100 may generate driving guide information in various forms, based on driving data, which corresponds to mutually different periods, of the accumulated driving data and the change of an item included in the driving data, or the like, and may display the generated driving guide information on the cluster screen 110.

Figure 7:
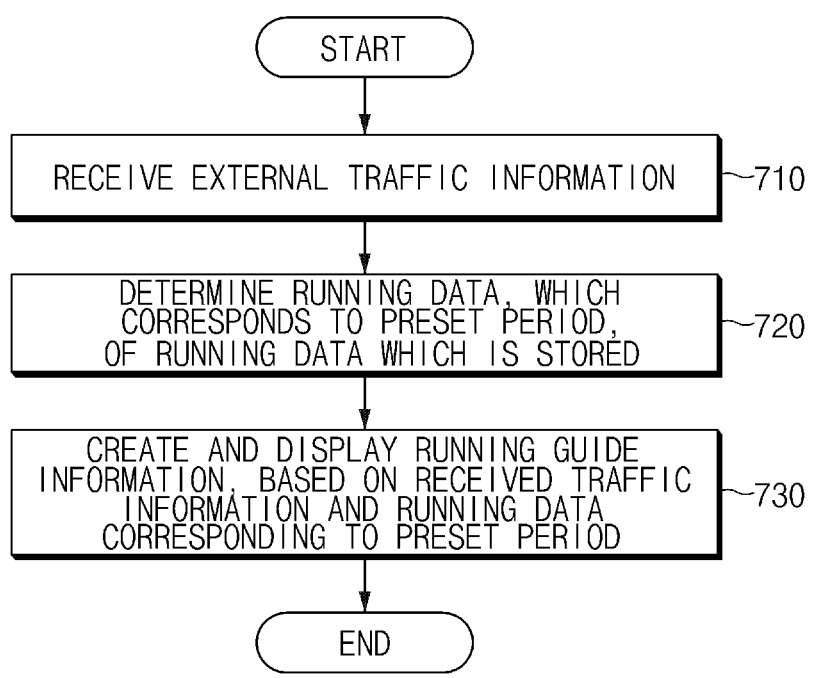
FIG. 7 is a flowchart illustrating the situation that the vehicle generates driving guide information based on traffic information and driving data and displays the driving guide information, according to an embodiment of the present disclosure.

FIG. 7 is a flowchart illustrating the situation that the vehicle generates driving guide information based on traffic information and driving data and displays the driving guide information, according to an embodiment.

Referring to operation 710, the vehicle 100 may receive traffic information. For example, the vehicle 100 may receive the traffic information by using a communication module (e.g., the communication module 210 of FIG. 2).

Referring to operation 720, the vehicle 100 may determine driving data, which is corresponding to a preset period, of driving data which is stored. The preset period may be, for example, a period corresponding to about one to 10 minutes before or after the vehicle 100 enters a preset location, such as an intersection, an uphill, a downhill, or the like. However, the present disclosure is not limited thereto. For example, the preset period may be a period ranging from one to five years, or a period from the moment that the vehicle 100 starts running at an initial stage to a current time. In other words, the vehicle 100 may utilize driving data, which corresponds to a necessary period, of the stored driving data, based on traffic information, which is being received, and a present state of the vehicle 100.

Referring to operation 730, the vehicle 100 may, based on the received traffic information and the driving data corresponding to the preset period generate and display driving guide information. The driving data corresponding to the preset period may be varied depending on vehicles. Accordingly, even if the same traffic information is received, the vehicles may generate mutually different driving guide information.

For example, even if the same traffic information is received, the vehicle 100 may generate and display different driving data in the case that the vehicle 100 continuously increases the speed and the case that the vehicle 100 continuously decreases the speed.

According to another embodiment, periods that the speed of the vehicle 100 is increased may be varied or the number of times of repeating the operation for decreasing the speed of the vehicle 100 may be varied. In this case, driving data, which is generated and displayed by the vehicle 100, may be varied.

According to an embodiment, a controlling method of a vehicle may include receiving traffic information from an external device, determining driving data, which corresponds to a preset period, of driving data of the vehicle, and generating and displaying driving guide information of the vehicle based on the traffic information and the driving data which corresponds to the preset period.

According to an embodiment, in the controlling method of the vehicle, the preset period may include a first period and a second period different from the first period, and the controlling method may include generating first driving guide information based on driving data corresponding to the first period, and generating second driving guide information different from the first driving guide information based on driving data corresponding to the second period.

According to an embodiment, in the controlling method of the vehicle, the generating and displaying of the driving guide information of the vehicle based on the traffic information and the driving data corresponding to the preset period may include generating first driving guide information or second driving guide information different from the first driving guide information based on a variation in a value included in at least one of items included in the driving data corresponding to the preset period.

According to an embodiment, in the controlling method of the vehicle, if the driving data is speed information of the vehicle, the controlling method may include generating and displaying the first driving guide information if the speed information of the vehicle exceeds a speed limit for the first period, and generating and displaying the second driving guide information, if the speed information of the vehicle exceeds the speed limit for the second period.

According to an embodiment, in the controlling method of the vehicle, if the driving data is speed variation information of the vehicle, the controlling method may include generating and displaying the first driving guide information based on first speed variation information corresponding to the first period, and generating and displaying the second driving guide information based on second speed variation information corresponding to the second period.

According to an embodiment, in the controlling method of the vehicle, if at least one of items included in the driving data corresponding to the preset period is posture information of the vehicle, the controlling method may include generating and displaying the first driving guide information if the vehicle is inclined in a first direction, and generating and displaying the second driving guide information if the vehicle is inclined in a second direction different from the first direction.

According to an embodiment, in the controlling method of the vehicle, the controlling method may include updating the driving data of the vehicle, which is stored in the memory, at a specific cycle if the vehicle moves.

According to an embodiment, in the controlling method of the vehicle, at least one of a character, an icon, or a color included in the second driving guide information may be displayed differently from the first driving guide information.

Figure 8:
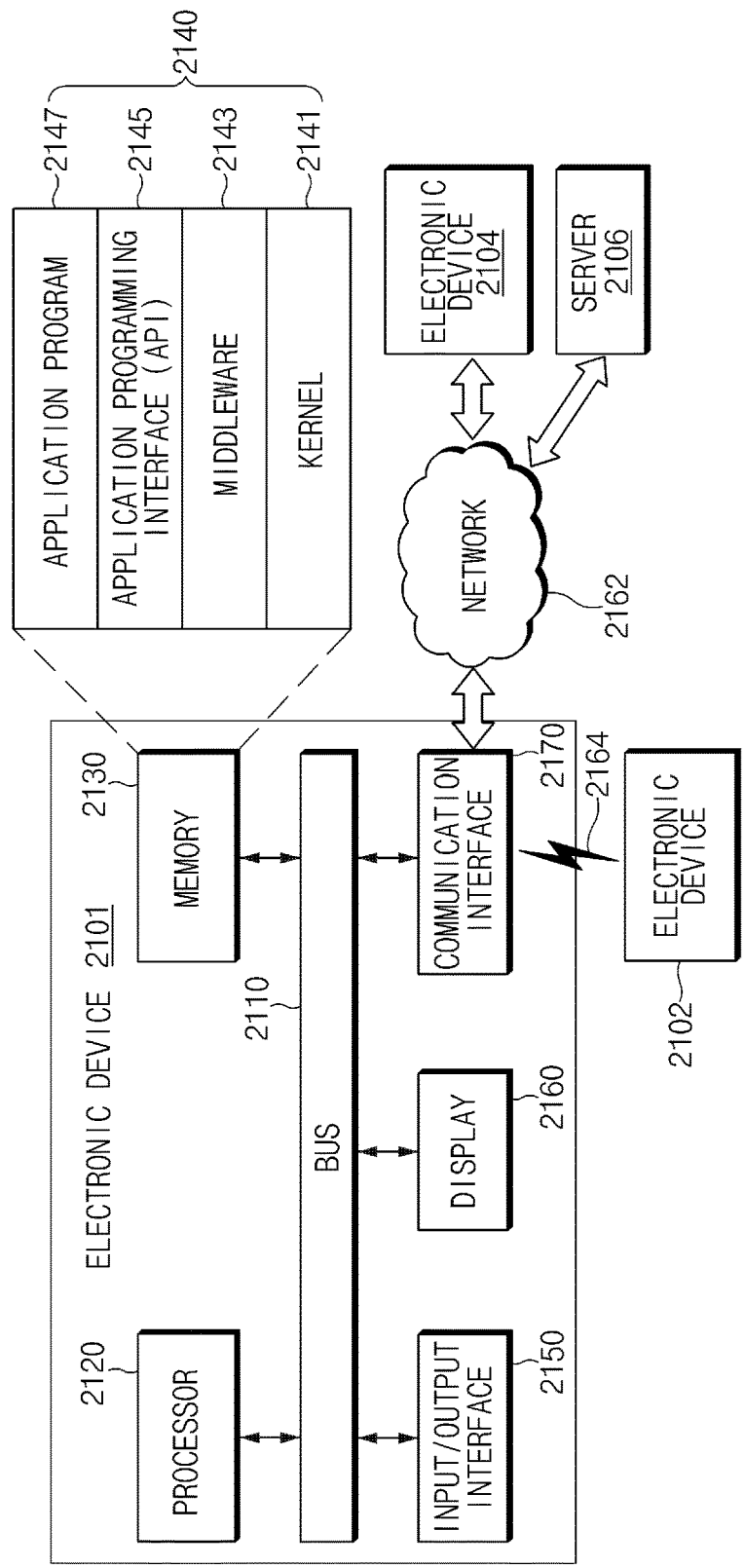
FIG. 8 illustrates an electronic device in a network environment according to various embodiments of the present disclosure.

Referring to FIG. 8, according to various embodiments, an electronic device 2101 in a network environment is described. The electronic device 2101 may correspond to the vehicle 100. The electronic device 2101 may include a bus 2110, a processor 2120, a memory 2130, an input/output interface 2150, a display 2160, and a communication interface 2170. The processor 2120 may correspond to processor 220. The memory 2130 may correspond to memory 240. The input/output interface may correspond to the deceleration device 208, an acceleration device 202, and/or steering device 120. Display 2160 may correspond to display 230. The communications interface 2170 may correspond to communication module 210. According to an embodiment, the electronic device 2101 may not include at least one of the above-described elements or may further include other elements. The bus 2110 may interconnect the above-described elements 2110 to 2170 and may include a circuit for conveying communications (e.g., a control message and/or data) among the above-described elements. The processor 2120 may include one or more of a central processing unit (CPU), an application processor (AP), or a communication processor (CP). For example, the processor 2120 may perform an arithmetic operation or data processing associated with control and/or communication of at least other elements of the electronic device 2101.

The memory 2130 may include a volatile and/or nonvolatile memory. For example, the memory 2130 may store instructions or data associated with at least one other element(s) of the electronic device 2101. According to an embodiment, the memory 2130 may store software and/or a program 2140. The program 2140 may include, for example, a kernel 2141, a middleware 2143, an application programming interface (API) 2145, and/or an application program (or "an application") 2147. At least a part of the kernel 2141, the middleware 2143, or the API 2145 may be referred to as an "operating system (OS)". For example, the kernel 2141 may control or manage system resources (e.g., the bus 2110, the processor 2120, the memory 2130, and the like) that are used to execute operations or functions of other programs (e.g., the middleware 2143, the API 2145, and the application program 2147). Furthermore, the kernel 2141 may provide an interface that allows the middleware 2143, the API 2145, or the application program 2147 to access discrete elements of the electronic device 2101 so as to control or manage system resources.

The middleware 2143 may perform, for example, a mediation role such that the API 2145 or the application program 2147 communicates with the kernel 2141 to exchange data. Furthermore, the middleware 2143 may process one or more task requests received from the application program 2147 according to a priority. For example, the middleware 2143 may assign the priority, which makes it possible to use a system resource (e.g., the bus 2110, the processor 2120, the memory 2130, or the like) of the electronic device 2101, to at least one of the application program 2147 and may process the one or more task requests. The API 2145 may be an interface through which the application program 2147 controls a function provided by the kernel 2141 or the middleware 2143, and may include, for example, at least one interface or function (e.g., an instruction) for a file control, a window control, image processing, a character control, or the like. The input/output interface 2150 may transmit an instruction or data input from a user or another external device, to other element(s) of the electronic device 2101 or may output an instruction or data, received from other element(s) of the electronic device 2101, to a user or another external device.

The display 2160 may include, for example, a liquid crystal display (LCD), a light-emitting diode (LED) display, an organic LED (OLED) display, a microelectromechanical systems (MEMS) display, or an electronic paper display. The display 2160 may display, for example, various contents (e.g., a text, an image, a video, an icon, a symbol, and the like) to a user. The display 2160 may include a touch screen and may receive, for example, a touch, gesture, proximity, or hovering input using an electronic pen or a part of a user's body. For example, the communication interface 2170 may establish communication between the electronic device 2101 and an external device (e.g., the first electronic device 2102, the second electronic device 2104, or the server 2106). For example, the communication interface 2170 may be connected to the network 2162 over wireless communication or wired communication to communicate with the external device (e.g., the second electronic device 2104 or the server 2106).

For example, the wireless communication may include cellular communication using at least one of long-term evolution (LTE), LTE Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), or the like. The wireless communication may include at least one of wireless fidelity (Wi-Fi), Bluetooth, Bluetooth low energy (BLE), Zigbee, near field communication (NFC), magnetic stripe transmission (MST), radio frequency (RF), a body area network, or the like. According to an embodiment, the wireless communication may include GNSS. The GNSS may be one of, for example, a global positioning system (GPS), a global navigation satellite system (Glonass), a Beidou navigation satellite system (hereinafter referred to as "Beidou"), or an European global satellite-based navigation system (hereinafter referred to as "Galileo"). Hereinafter, in this disclosure, "GPS" and "GNSS" may be interchangeably used. The wired communication may include at least one of, for example, a universal serial bus (USB), a high definition multimedia interface (HDMI), a recommended standard-2232 (RS-2232), powerline communication, a plain old telephone service (POTS), or the like. The network 2162 may include at least one of telecommunications networks, for example, a computer network (e.g., LAN or WAN), an Internet, or a telephone network.

Each of the first and second external electronic devices 2102 and 2104 may be a device of which the type is different from or the same as that of the electronic device 2101. According to various embodiments, all or a portion of operations that the electronic device 2101 will perform may be executed by another or plural electronic devices (e.g., the first electronic device 2102, the second electronic device 2104 or the server 2106). According to an embodiment, in the case where the electronic device 2101 executes any function or service automatically or in response to a request, the electronic device 2101 may not perform the function or the service internally, but, alternatively additionally, it may request at least a portion of a function associated with the electronic device 2101 at other electronic device (e.g., the electronic device 2102 or 2104 or the server 2106). The other electronic device (e.g., the electronic device 2102 or 2104 or the server 2106) may execute the requested function or additional function and may transmit the execution result to the electronic device 2101. The electronic device 2101 may provide the requested function or service using the received result or may additionally process the received result to provide the requested function or service. To this end, for example, cloud computing, distributed computing, or client-server computing may be used.

Figure 9:
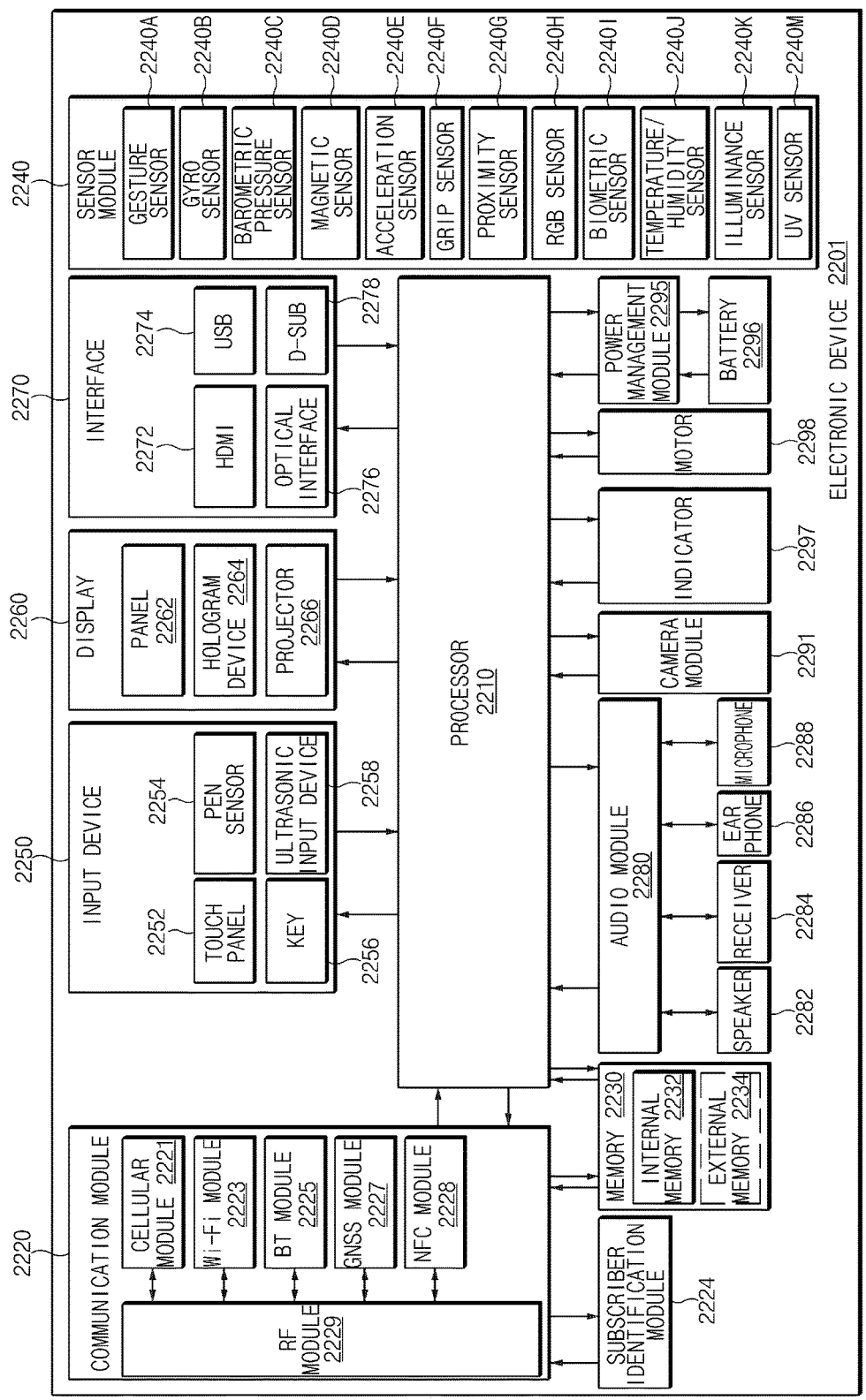
FIG. 9 is a block diagram of an electronic device according to various embodiments of the present disclosure.

FIG. 9 illustrates a block diagram of an electronic device, according to various embodiments. An electronic device 2201 may include, for example, all or a part of the electronic device 2101 illustrated in FIG. 8 or the vehicle 100 illustrated in FIG. 1. The electronic device 2201 may include one or more processors (e.g., an application processor (AP)) 2210, a communication module 2220, a subscriber identification module 2224, a memory 2230, a sensor module 2240, an input device 2250, a display 2260, an interface 2270, an audio module 2280, a camera module 2291, a power management module 2295, a battery 2296, an indicator 2297, and a motor 2298. For example, the processor 2210 may be implemented with a System on Chip (SoC). According to an embodiment, the processor 2210 may further include a graphic processing unit (GPU) and/or an image signal processor. The processor 2210 may include at least a part (e.g., a cellular module 2221) of elements illustrated in FIG. 9. The processor 2210 may load an instruction or data, which is received from at least one of other elements (e.g., a nonvolatile memory), into a volatile memory and process the loaded instruction or data. The processor 2210 may store result data in the nonvolatile memory.

The communication module 2220 may be configured the same as or similar to the communication interface 2170 of FIG. 8. The communication module 2220 may include the cellular module 2221, a Wi-Fi module 2223, a Bluetooth (BT) module 2225, a GNSS module 2227, a near field communication (NFC) module 2228, and a radio frequency (RF) module 2229. The cellular module 2221 may provide, for example, voice communication, video communication, a character service, an Internet service, or the like over a communication network. According to an embodiment, the cellular module 2221 may perform discrimination and authentication of the electronic device 2201 within a communication network by using the subscriber identification module (e.g., a SIM card) 2224. According to an embodiment, the cellular module 2221 may perform at least a portion of functions that the processor 2210 provides. According to an embodiment, the cellular module 2221 may include a communication processor (CP). According to an embodiment, at least a part (e.g., two or more) of the cellular module 2221, the Wi-Fi module 2223, the BT module 2225, the GNSS module 2227, or the NFC module 2228 may be included within one Integrated Circuit (IC) or an IC package. For example, the RF module 2229 may transmit and receive a communication signal (e.g., an RF signal). For example, the RF module 2229 may include a transceiver, a power amplifier module (PAM), a frequency filter, a low noise amplifier (LNA), an antenna, or the like. According to another embodiment, at least one of the cellular module 2221, the Wi-Fi module 2223, the BT module 2225, the GNSS module 2227, or the NFC module 2228 may transmit and receive an RF signal through a separate RF module. The subscriber identification module 2224 may include, for example, a card and/or embedded SIM that includes a subscriber identification module and may include unique identify information (e.g., integrated circuit card identifier (ICCID)) or subscriber information (e.g., international mobile subscriber identity (IMSI)).

The memory 2230 (e.g., the memory 2130) may include an internal memory 2232 or an external memory 2234. For example, the internal memory 2232 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory, a hard drive, or a solid state drive (SSD). The external memory 2234 may include a flash drive such as compact flash (CF), secure digital (SD), micro secure digital (Micro-SD), mini secure digital (Mini-SD), extreme digital (xD), a multimedia card (MMC), a memory stick, or the like. The external memory 2234 may be operatively and/or physically connected to the electronic device 2201 through various interfaces.

The sensor module 2240 may measure, for example, a physical quantity or may detect an operation state of the electronic device 2201. The sensor module 2240 may convert the measured or detected information to an electric signal. For example, the sensor module 2240 may include at least one of a gesture sensor 2240A, a gyro sensor 2240B, a barometric pressure sensor 2240C, a magnetic sensor 2240D, an acceleration sensor 2240E, a grip sensor 2240F, the proximity sensor 2240G, a color sensor 2240H (e.g., red, green, blue (RGB) sensor), a biometric sensor 2240I, a temperature/humidity sensor 2240J, an illuminance sensor 2240K, or an UV sensor 2240M. Although not illustrated, additionally or generally, the sensor module 2240 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 2240 may further include a control circuit for controlling one or more sensors included therein. According to an embodiment, the electronic device 2201 may further include a processor that is a part of the processor 2210 or independent of the processor 2210 and is configured to control the sensor module 2240. The processor may control the sensor module 2240 while the processor 2210 remains at a sleep state.

The input device 2250 may include, for example, a touch panel 2252, a (digital) pen sensor 2254, a key 2256, or an ultrasonic input unit 2258. For example, the touch panel 2252 may use at least one of capacitive, resistive, infrared and ultrasonic detecting methods. Also, the touch panel 2252 may further include a control circuit. The touch panel 2252 may further include a tactile layer to provide a tactile reaction to a user. The (digital) pen sensor 2254 may be, for example, a part of a touch panel or may include an additional sheet for recognition. The key 2256 may include, for example, a physical button, an optical key, or a keypad. The ultrasonic input device 2258 may detect (or sense) an ultrasonic signal, which is generated from an input device, through a microphone (e.g., a microphone 2288) and may check data corresponding to the detected ultrasonic signal.

The display 2260 (e.g., the display 2160) may include a panel 2262, a hologram device 2264, a projector 2266, and/or a control circuit for controlling the panel 2262, the hologram device 2264, or the projector 2266. The panel 2262 may be implemented, for example, to be flexible, transparent or wearable. The panel 2262 and the touch panel 2252 may be integrated into a single module. According to an embodiment, the panel 2262 may include a pressure sensor (or force sensor) that measures the intensity of touch pressure by a user. The pressure sensor may be implemented integrally with the touch panel 2252, or may be implemented as at least one sensor separately from the touch panel 2252. The hologram device 2264 may display a stereoscopic image in a space using a light interference phenomenon. The projector 2266 may project light onto a screen so as to display an image. For example, the screen may be arranged in the inside or the outside of the electronic device 2201. The interface 2270 may include, for example, a high-definition multimedia interface (HDMI) 2272, a universal serial bus (USB) 2274, an optical interface 2276, or a D-subminiature (D-sub) 2278. The interface 2270 may be included, for example, in the communication interface 2170 illustrated in FIG. 8. Additionally or generally, the interface 2270 may include, for example, a mobile high definition link (MHL) interface, a SD card/multi-media card (MMC) interface, or an infrared data association (IrDA) standard interface.

The audio module 2280 may convert a sound and an electric signal in dual directions. At least a part of the audio module 2280 may be included, for example, in the input/ output interface 2150 illustrated in FIG. 8. The audio module 2280 may process, for example, sound information that is input or output through a speaker 2282, a receiver 2284, an earphone 2286, or the microphone 2288. For example, the camera module 2291 may shoot a still image or a video. According to an embodiment, the camera module 2291 may include at least one or more image sensors (e.g., a front sensor or a rear sensor), a lens, an image signal processor (ISP), or a flash (e.g., an LED or a xenon lamp). The power management module 2295 may manage, for example, power of the electronic device 2201. According to an embodiment, a power management integrated circuit (PMIC), a charger IC, or a battery or fuel gauge may be included in the power management module 2295. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, a rectifier, or the like. The battery gauge may measure, for example, a remaining capacity of the battery 2296 and a voltage, a current or a temperature thereof while the battery is charged. The battery 2296 may include, for example, a rechargeable battery and/or a solar battery.

The indicator 2297 may display a specific state of the electronic device 2201 or a part thereof (e.g., the processor 2210), such as a booting state, a message state, a charging state, and the like. The motor 2298 may convert an electrical signal into a mechanical vibration and may generate the following effects: vibration, haptic, and the like. The electronic device 2201 may include a processing device (e.g., a GPU) for supporting a mobile TV. The processing device for supporting the mobile TV may process media data according to the standards of digital multimedia broadcasting (DMB), digital video broadcasting (DVB), MediaFLO™, or the like. Each of the above-mentioned elements of the electronic device according to various embodiments of the present disclosure may be configured with one or more components, and the names of the elements may be changed according to the type of the electronic device. In various embodiments, some elements of the electronic device (e.g., the electronic device 2201) may be omitted or other additional elements may be added. Furthermore, some of the elements of the electronic device may be combined with each other so as to form one entity, so that the functions of the elements may be performed in the same manner as before the combination.

Figure 10:
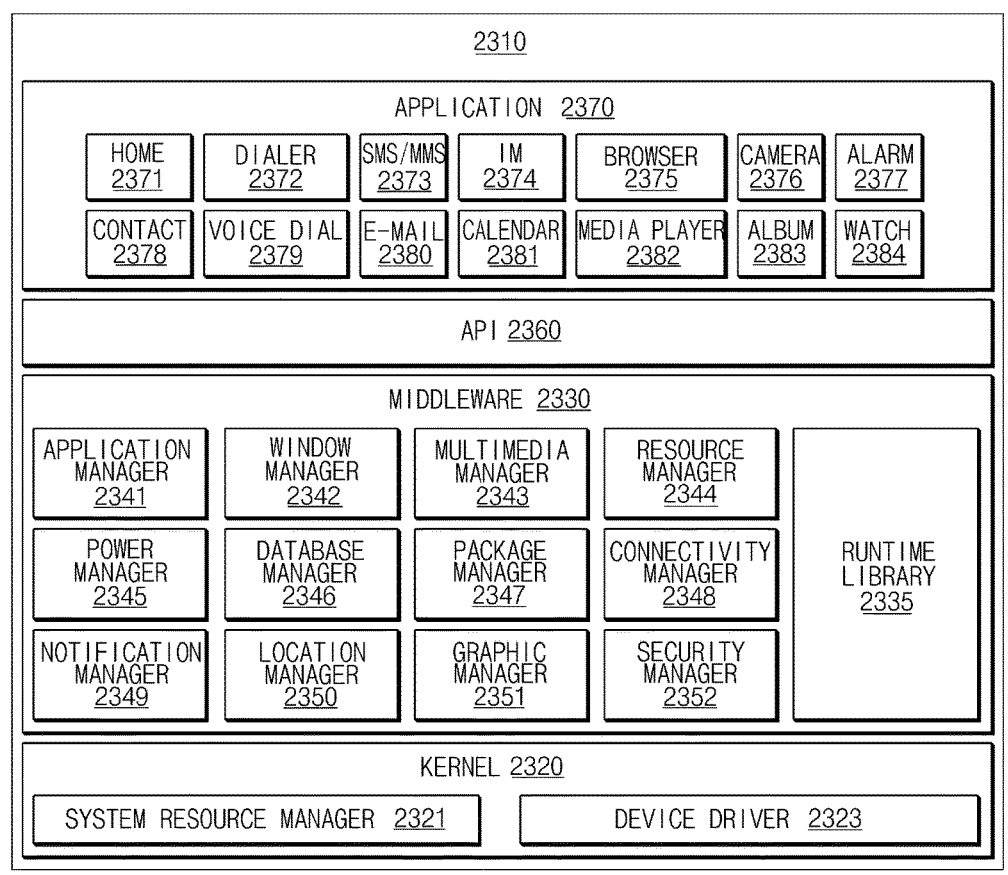
FIG. 10 is a block diagram of a program module according to various embodiments of the present disclosure.

FIG. 10 illustrates a block diagram of a program module, according to various embodiments. According to an embodiment, a program module 2310 (e.g., the program 2140) may include an operating system (OS) to control resources associated with an electronic device (e.g., the electronic device 2101), and/or diverse applications (e.g., the application program 2147) driven on the OS. The OS may be, for example, Android™, iOS™, Windows™ Symbian™, Tizen™, or Bada™. The program module 2310 may include a kernel 2320 (e.g., the kernel 2141), a middleware 2330 (e.g., the middleware 2143), an application programming interface (API) 2360 (e.g., the API 2145), and/or an application 2370 (e.g., the application program 2147). At least a portion of the program module 2310 may be preloaded on an electronic device or may be downloadable from an external electronic device (e.g., the first electronic device 2102, the second electronic device 2104, the server 2106, or the like).

The kernel 2320 (e.g., the kernel 2141) may include, for example, a system resource manager 2321 or a device driver 2323. The system resource manager 2321 may control, allocate, or retrieve system resources. According to an embodiment, the system resource manager 2321 may include a process managing unit, a memory managing unit, a file system managing unit, or the like. The device driver 2323 may include, for example, a display driver, a camera driver, a Bluetooth driver, a shared memory driver, a USB driver, a keypad driver, a Wi-Fi driver, an audio driver, or an inter-process communication (IPC) driver. The middleware 2330 may provide, for example, a function that the application 2370 needs in common, or may provide diverse functions to the application 2370 through the API 2360 to allow the application 2370 to efficiently use limited system resources of the electronic device. According to an embodiment, the middleware 2330 may include at least one of a runtime library 2335, an application manager 2341, a window manager 2342, a multimedia manager 2343, a resource manager 2344, a power manager 2345, a database manager 2346, a package manager 2347, a connectivity manager 2348, a notification manager 2349, a location manager 2350, a graphic manager 2351, or a security manager 2352.

The runtime library 2335 may include, for example, a library module that is used by a compiler to add a new function through a programming language while the application 2370 is being executed. The runtime library 2335 may perform input/output management, memory management, or capacities about arithmetic functions. The application manager 2341 may manage, for example, a life cycle of at least one application of the application 2370. The window manager 2342 may manage a graphic user interface (GUI) resource that is used in a screen. The multimedia manager 2343 may identify a format necessary for playing diverse media files, and may perform encoding or decoding of media files by using a codec suitable for the format. The resource manager 2344 may manage resources such as a memory space or source code of the application 2370. The power manager 2345 may manage a battery or power, and may provide power information for an operation of an electronic device. According to an embodiment, the power manager 2345 may operate with a basic input/output system (BIOS). The database manager 2346 may generate, search for, or modify database that is to be used in the application 2370. The package manager 2347 may install or update an application that is distributed in the form of package file.

The connectivity manager 2348 may manage, for example, wireless connection. The notification manager 2349 may provide an event, for example, arrival message, appointment, or proximity notification to a user. For example, the location manager 2350 may manage location information about an electronic device. The graphic manager 2351 may manage a graphic effect that is provided to a user, or manage a user interface relevant thereto. The security manager 2352 may provide, for example, system security or user authentication. According to an embodiment, the middleware 2330 may include a telephony manager for managing a voice or video call function of the electronic device or a middleware module that combines diverse functions of the above-described elements. According to an embodiment, the middleware 2330 may provide a module specialized to each OS kind to provide differentiated functions. Additionally, the middleware 2330 may dynamically remove a part of the preexisting elements or may add new elements thereto. The API 2360 may be, for example, a set of programming functions and may be provided with a configuration that is variable depending on an OS. For example, in the case where an OS is the android or the iOS, it may provide one API set per platform. In the case where an OS is the tizen, it may provide two or more API sets per platform.

The application 2370 may include, for example, applications such as a home 2371, a dialer 2372, an SMS/MMS 2373, an instant message (IM) 2374, a browser 2375, a camera 2376, an alarm 2377, a contact 2378, a voice dial 2379, an e-mail 2380, a calendar 2381, a media player 2382, an album 2383, a watch 2384, health care (e.g., measuring an exercise quantity, blood sugar, or the like) or offering of environment information (e.g., information of barometric pressure, humidity, temperature, or the like). According to an embodiment, the application 2370 may include an information exchanging application to support information exchange between an electronic device and an external electronic device. The information exchanging application may include, for example, a notification relay application for transmitting specific information to an external electronic device, or a device management application for managing the external electronic device. For example, the notification relay application may include a function of transmitting notification information, which arise from other applications, to an external electronic device or may receive, for example, notification information from an external electronic device and provide the notification information to a user. The device management application may install, delete, or update for example, a function (e.g., turn-on/turn-off of an external electronic device itself (or a part of components) or adjustment of brightness (or resolution) of a display) of the external electronic device which communicates with the electronic device, and an application running in the external electronic device. According to an embodiment, the application 2370 may include an application (e.g., a health care application of a mobile medical device) that is assigned in accordance with an attribute of an external electronic device. According to an embodiment, the application 2370 may include an application that is received from an external electronic device. At least a portion of the program module 2310 may be implemented by software, firmware, hardware (e.g., the processor 2210), or a combination (e.g., execution) of two or more thereof, and may include modules, programs, routines, sets of instructions, processes, or the like for performing one or more functions.

The term "module" used in this disclosure may include a unit composed of hardware, software and firmware and may be interchangeably used with the terms "unit", "logic", "logical block", "component" and "circuit". The "module" may be an integrated component or may be a minimum unit for performing one or more functions or a part thereof. The "module" may be implemented mechanically or electronically and may include at least one of an application-specific IC (ASIC) chip, a field-programmable gate array (FPGA), and a programmable-logic device for performing some operations, which are known or will be developed. At least a part of an apparatus (e.g., modules or functions thereof) or a method (e.g., operations) according to various embodiments may be, for example, implemented by instructions stored in computer-readable storage media (e.g., the memory 2130) in the form of a program module. The instruction, when executed by a processor (e.g., the processor 2120), may cause the processor to perform a function corresponding to the instruction. A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and an internal memory. Also, a program instruction may include not only a mechanical code such as things generated by a compiler but also a high-level language code executable on a computer using an interpreter. A module or a program module according to various embodiments may include at least one of the above elements, or a part of the above elements may be omitted, or other elements may be further included. Operations performed by a module, a program module, or other elements according to various embodiments may be executed sequentially, in parallel, repeatedly, or in a heuristic method or some operations may be executed in different sequences or may be omitted. Alternatively, other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A vehicle comprising:
   a display;
   a communication module;
   a memory; and
   one or more processors configured to:
   receive, through the communication module, traffic information from an external device,
   generate driving guide information of the vehicle based on driving data of the vehicle corresponding to a preset period, which is stored in the memory and the traffic information, and
   display, through the display, the generated driving guide information guiding to pass traffic lights or to wait at an intersection.

2. The vehicle of claim 1, wherein the preset period includes a first period and a second period different from the first period, and
   wherein the one or more processors are configured to:
   generate first driving guide information based on first driving data corresponding to the first period and the traffic information; and
   generate second driving guide information different from the first driving guide information based on second driving data corresponding to the second period and the traffic information.

3. The vehicle of claim 2, wherein, if the driving data is speed variation information of the vehicle, the one or more processors are configured to:
   generate and display the first driving guide information based on first speed variation information corresponding to the first period; and
   generate and display the second driving guide information based on second speed variation information corresponding to the second period.

4. The vehicle of claim 2, wherein the one or more processors are configured to:
   control at least one of a character, an icon, or a color included in the second driving guide information to be displayed differently from the first driving guide information.

5. The vehicle of claim 1, wherein the one or more processors are configured to:
   generate first driving guide information or second driving guide information, which is different from the first driving guide information, based on a variation in a value included in at least one of items included in the driving data corresponding to the preset period.

6. The vehicle of claim 1, wherein if at least one of items included in the driving data corresponding to the preset period is posture information of the vehicle, the one or more processors are configured to:

generate and display a first driving guide information if the vehicle is inclined in a first direction; and generate and display a second driving guide information if the vehicle is inclined in a second direction different from the first direction.

7. The vehicle of claim 1, wherein the one or more processors are configured to:

update the driving data of the vehicle, which is stored in the memory, at a specific cycle if the vehicle moves.

8. The vehicle of claim 1, wherein the traffic information further includes:

at least one of speed limit information for a road, traffic flow information, surrounding car information, obstacle information, urgent car information, or accident information.

9. The vehicle of claim 1, wherein the driving data of the vehicle includes:

at least one of car power information, car state information, gear state and shift information, speed information, a revolution per minute of an engine, acceleration and deceleration operation information, turn indicator information, navigation information, mileage information, tire pressure information, or driving mode information.

10. The vehicle of claim 1, wherein the traffic information indicates state of traffic lights corresponding to a moving direction of the vehicle, and wherein the one or more processors is configured to generate the driving guide information based on the state of traffic lights and speed variation information included in the driving data.

11. A controlling method of a vehicle, the controlling method comprising:

receiving traffic information from an external device;

determining driving data, which corresponds to a preset period, of driving data of the vehicle;

generating and displaying driving guide information of the vehicle based on the traffic information and the driving data which corresponds to the preset period; and displaying an instruction to pass traffic lights or to wait at an intersection.

12. The controlling method of claim 11, wherein the preset period includes a first period and a second period different from the first period, and wherein the controlling method includes:

generating first driving guide information based on first driving data corresponding to the first period and the traffic information; and generating second driving guide information different from the first driving guide information based on second driving data corresponding to the second period and the traffic information.

13. The controlling method of claim 12, wherein, if the driving data is speed information of the vehicle, the controlling method includes:

generating and displaying the first driving guide information if the speed information of the vehicle exceeds a speed limit for the first period; and generating and displaying the second driving guide information, if the speed information of the vehicle exceeds the speed limit for the second period.

14. The controlling method of claim 12, wherein, if the driving data is speed variation information of the vehicle, the controlling method includes:

generating and displaying the first driving guide information based on first speed variation information corresponding to the first period; and generating and displaying the second driving guide information based on second speed variation information corresponding to the second period.

15. The controlling method of claim 12, wherein the controlling method includes:

displaying at least one of a character, an icon, or a color included in the second driving guide information differently from the first driving guide information.

16. The controlling method of claim 11, wherein the generating and displaying of the driving guide information of the vehicle based on the traffic information and the driving data corresponding to the preset period includes:

generating first driving guide information or second driving guide information different from the first driving guide information based on a variation in a value included in at least one of items included in the driving data corresponding to the preset period.

17. The controlling method of claim 16, wherein, if at least one of items included in the driving data corresponding to the preset period is posture information of the vehicle, the controlling method includes:

generating and displaying the first driving guide information if the vehicle is inclined in a first direction; and generating and displaying the second driving guide information if the vehicle is inclined in a second direction different from the first direction.

18. The controlling method of claim 16, wherein the controlling method includes:

displaying at least one of a character, an icon, or a color included in the second driving guide information is displayed differently from the first driving guide information.

19. The controlling method of claim 11, wherein the controlling method includes:

updating the driving data of the vehicle, which is previously stored in memory, at a specific cycle if the vehicle moves.

20. A non-transitory storage medium for storing instructions for executing a controlling method of a vehicle, wherein the storage medium is configured to store instructions that, when executed, perform operations comprising:

receiving traffic information from an external device;

determining driving data, which corresponds to a preset period, of driving data of the vehicle;

generating and displaying driving guide information of the vehicle based on traffic information, which is received from the external device, and the driving data which corresponds to the preset periods; and displaying an instruction to pass traffic lights or to wait at an intersection.

* * * * *